US009660518B2

(12) United States Patent
Nomura et al.

(10) Patent No.: US 9,660,518 B2
(45) Date of Patent: May 23, 2017

(54) SWITCHING CONVERTER

(71) Applicant: SEMICONDUCTOR ENERGY LABORATORY CO., LTD., Atsugi-shi, Kanagawa-ken (JP)

(72) Inventors: Masumi Nomura, Kanagawa (JP); Kosei Noda, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 148 days.

(21) Appl. No.: 13/875,415

(22) Filed: May 2, 2013

(65) Prior Publication Data
US 2013/0294120 A1    Nov. 7, 2013

(30) Foreign Application Priority Data

May 2, 2012    (JP) .................................. 2012-105359
Mar. 5, 2013   (JP) .................................. 2013-042517

(51) Int. Cl.
H02M 1/36       (2007.01)
H02M 7/517      (2006.01)
(Continued)

(52) U.S. Cl.
CPC .............. *H02M 1/36* (2013.01); *H02M 3/335* (2013.01); *H02M 3/33507* (2013.01);
(Continued)

(58) Field of Classification Search
CPC ...... H02M 1/36; H02M 3/3357; H02M 7/517; H02M 2001/0006; H02M 3/335; H02M 3/33523; H02H 9/001; H03M 3/33507
See application file for complete search history.

(56) References Cited

U.S. PATENT DOCUMENTS 5,014,178 A  *  5/1991  Balakrishnan .................. 363/49
5,640,317 A      6/1997  Lei
(Continued)

FOREIGN PATENT DOCUMENTS

EP    1 737 044 A1    12/2006
EP    2202802 A        6/2010
(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters) , Sep. 27, 2004, vol. 85, No. 13, pp. 2541-2543.

(Continued)

*Primary Examiner* — Fred E Finch, III
*Assistant Examiner* — Rafael O De Leon Domenech
(74) *Attorney, Agent, or Firm* — Nixon Peabody LLP; Jeffrey L. Costellia

(57) ABSTRACT

A switching converter in which deterioration and breakage can be suppressed is provided. A switching converter whose area can be reduced is provided. The switching converter includes a switch connected to a power supply portion; a transformer connected to the power supply portion; a first rectifying and smoothing circuit and a second rectifying and smoothing circuit each connected to at least the transformer; and a switching control circuit which is connected to the first rectifying and smoothing circuit and the second rectifying and smoothing circuit and which controls operation of the switch. The switching control circuit includes a control circuit controlling on/off of the switch and operation of a starter circuit; and the starter circuit controlling startup of the control circuit. The starter circuit includes a transistor and a resistor each including a wide-gap semiconductor.

8 Claims, 20 Drawing Sheets

(51) Int. Cl.
   *H02M 3/335* (2006.01)
   *H02M 1/00* (2006.01)
(52) U.S. Cl.
   CPC ........ *H02M 3/33523* (2013.01); *H02M 7/517* (2013.01); *H02M 2001/0006* (2013.01)

(56) References Cited

U.S. PATENT DOCUMENTS

| | | | |
|---|---|---|---|
| 5,731,856 | A | 3/1998 | Kim et al. |
| 5,744,864 | A | 4/1998 | Cillessen et al. |
| 6,294,274 | B1 | 9/2001 | Kawazoe et al. |
| 6,563,174 | B2 | 5/2003 | Kawasaki et al. |
| 6,727,522 | B1 | 4/2004 | Kawasaki et al. |
| 6,906,934 | B2 | 6/2005 | Yang et al. |
| 7,038,253 | B2 * | 5/2006 | Yoshida ............ H01L 29/66462 257/188 |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,723,972 | B1 * | 5/2010 | Balogh ................... H02M 1/36 323/282 |
| 7,732,819 | B2 | 6/2010 | Akimoto et al. |
| 8,367,489 | B2 | 2/2013 | Yamazaki |
| 8,653,514 | B2 | 2/2014 | Yamazaki |
| 8,698,138 | B2 | 4/2014 | Yamazaki |
| 9,076,877 | B2 | 7/2015 | Yamazaki |
| 9,202,827 | B2 | 12/2015 | Koyama et al. |
| 9,368,640 | B2 | 6/2016 | Yamazaki |
| 9,443,888 | B2 | 9/2016 | Koyama et al. |
| 9,496,416 | B2 | 11/2016 | Yamazaki |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0052886 | A1 * | 3/2005 | Yang ...................... H02M 1/36 363/49 |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0096255 | A1 * | 5/2007 | Huang et al. .................. 257/536 |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0163874 | A1 * | 7/2010 | Koyama .................. H01L 27/12 257/57 |
| 2011/0101333 | A1 | 5/2011 | Shionoiri et al. |
| 2011/0101942 | A1 | 5/2011 | Yamazaki et al. |
| 2011/0127522 | A1 | 6/2011 | Yamazaki |
| 2011/0248261 | A1 * | 10/2011 | Yamazaki ........... H01L 29/7869 257/43 |
| 2011/0298279 | A1 * | 12/2011 | Dimrco et al. ................. 307/31 |
| 2013/0271220 | A1 | 10/2013 | Takahashi et al. |

FOREIGN PATENT DOCUMENTS

| | | | |
|---|---|---|---|
| EP | 2 226 847 | A2 | 9/2010 |
| EP | 2515337 | A | 10/2012 |
| JP | 60-198861 | | 10/1985 |
| JP | 63-210022 | | 8/1988 |
| JP | 63-210023 | | 8/1988 |
| JP | 63-210024 | | 8/1988 |
| JP | 63-215519 | | 9/1988 |
| JP | 63-239117 | | 10/1988 |
| JP | 63-265818 | | 11/1988 |
| JP | 05-251705 | | 9/1993 |
| JP | 08-264794 | | 10/1996 |
| JP | 11-505377 | | 5/1999 |
| JP | 2000-044236 | | 2/2000 |
| JP | 2000-150900 | | 5/2000 |
| JP | 2000-323707 | | 11/2000 |
| JP | 2002-076356 | | 3/2002 |
| JP | 2002-078340 | A | 3/2002 |
| JP | 2002-127579 | | 5/2002 |
| JP | 2002-289859 | | 10/2002 |
| JP | 2003-086000 | | 3/2003 |
| JP | 2003-086808 | | 3/2003 |
| JP | 2004-103957 | | 4/2004 |

(56) References Cited

FOREIGN PATENT DOCUMENTS

| JP | 2004-273614 | | 9/2004 |
|---|---|---|---|
| JP | 2004-273732 | | 9/2004 |
| JP | 2010-171394 | A | 8/2010 |
| JP | 2011-119671 | A | 6/2011 |
| JP | 2011-125132 | A | 6/2011 |
| JP | 2011-135067 | A | 7/2011 |
| JP | 2011-233880 | A | 11/2011 |
| JP | 4865189 | | 2/2012 |
| JP | 2012-075229 | A | 4/2012 |
| WO | WO-2004/114391 | A1 | 12/2004 |
| WO | WO-2011/052386 | | 5/2011 |
| WO | WO-2011/065244 | | 6/2011 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Dispay Workshops, Dec. 3, 2008, pp. 1637-1640.

Hayashi.R et al., "42.1: Invited Paper: Improved Amorphous In—Ga—Zo—O TFTs.", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the In2O—Ga2ZnO4—ZnO system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5, InGaO3(ZnO)3, and Ga2O3(ZnO)m (m=7, 8, 9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09 : SID International Symposium Digest of Technical Paper, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp 633-636.

Lee.J et al., "World'S Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MoO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDE '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '09 : SID International Sysmposium Digest of Technical Papers, May 20, 2008, vol. 39, No. 1, pp. 1-4.

Park.J et al., "High performance amorphous oxide thin film transistors with self-aligned top-gate structure,", IEDM 09: Technial Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest 3 09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Sysmosium Digest of Technical Papers, May 31, 2008, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata J et al., "Development of 4.0-In. AMOLED Display With Driver Circuit Using Amorphous In—Ga—Zn—Oxide TTFs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

(56) References Cited

OTHER PUBLICATIONS

Hirao.T et al., "Novel Top-Gate Zinc Oxide Thin-Film Transistors (ZnO TFTs) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2008, pp. 1110-1112.

Ohara.H et al., "21.3:4.0 In. QVGA AMOLED Display Using In—Ga—Zn—Oxide TFTs With a Novel Passivation Layer,", SID Digest '09 : SID International Symposium Digest of Technical Papers, May 31, 2008, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2008, pp. 578-581.

Asaoka.Y et al., "29,1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,Or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emissin AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics), 2006, vol. 45, No. 5B. pp 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Aplied Physics Letters), 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies In ZnO,", Appl. Phys. Lett. (Applied Physics Letters), 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

\* cited by examiner

SWITCHING CONVERTER

BACKGROUND OF THE INVENTION

1. Field of the Invention

The present invention relates to a switching converter and a semiconductor device.

2. Description of the Related Art

A switching converter is a constant-voltage circuit with which a constant output voltage can be obtained regardless of the value of an input voltage, and the switching converter is used for a power supply circuit together with a rectification circuit or the like. In particular, a power supply circuit including a switching converter is also referred to as switching power source or switching regulator.

The switching type switching converter outputs a voltage of a predetermined level in such a manner that a voltage with a pulse waveform is formed using an input voltage by a switching element and the voltage is smoothed or held in a coil, a capacitor, or the like. With the switching type switching converter, internal power loss can be lower theoretically, whereby the power conversion efficiency can be high and heat radiation due to power loss can be suppressed in comparison with a linear type switching converter utilizing voltage drop due to resistance. Therefore, in a semiconductor device which needs a high output voltage, such as a microprocessor, a power supply circuit including the switching type switching converter is often used.

Furthermore, a switching regulator provided with a main switch, a starter switch for controlling switching of the main switch, a high-pressure portion including a starting resistor that is provided for starting the starter switch, and a control portion for processing a low voltage signal is known (see Patent Document 1).

REFERENCE

[Patent Document 1] Japanese Published Patent Application No. 2000-323707

SUMMARY OF THE INVENTION

However, the starter switch, main switch, starting resistor, and the like have problems of deterioration and breakage because a high voltage is applied thereto from a power supply portion. In particular, the starter switch using a transistor preferably has a larger channel width in order to make a large amount of current flow when a high voltage is supplied from the power supply portion. The problem of deterioration and breakage of the starter switch becomes serious by such an increase in channel width.

In addition, in the case where a starter switch included in a starter circuit and a control circuit are formed over the same semiconductor substrate, a large amount of current flows into the starter switch included in the starter circuit when power is supplied to a switching converter, whereby the voltage on the semiconductor substrate is changed. In other words, noise occurs. To suppress adverse effects of the noise generated in the starter switch, it is necessarily to provide a guard ring to surround the starter switch. However, in the case of providing a guard ring in the switching converter, the area occupied by the starter circuit and the area occupied by the switching converter including the starter circuit are extremely increased.

In view of the above, one embodiment of the present invention provides a switching converter in which deterioration and breakage can be suppressed. Another embodiment of the present invention provides a switching converter whose area can be reduced.

One embodiment of the present invention is a switching converter including a switch connected to a power supply portion; a transformer connected to the power supply portion; a first rectifying and smoothing circuit and a second rectifying and smoothing circuit each connected to at least the transformer; and a switching control circuit which is connected to the first rectifying and smoothing circuit and the second rectifying and smoothing circuit and which controls operation of the switch. The switching control circuit includes a control circuit controlling on/off of the switch and operation of a starter circuit; and the starter circuit controlling startup of the control circuit. The starter circuit includes a transistor and a resistor each including a wide-gap semiconductor.

One embodiment of the present invention is a switching converter including a transformer connected to a power supply portion; a switch connected to the transformer; a switching control circuit connected to the switch; a first rectifying and smoothing circuit connected to the transformer and an output portion; and a second rectifying and smoothing circuit connected to the transformer and the switching control circuit. The switching control circuit includes a control circuit and a starter circuit. The starter circuit includes a first transistor and a second transistor each including a wide-gap semiconductor, and a resistor including a wide-gap semiconductor between a first terminal and a second terminal.

One embodiment of the present invention is a switching converter including a switch connected to a power supply portion; a transformer connected to the switch; a switching control circuit connected to the power supply portion and the switch; a first rectifying and smoothing circuit connected to the switch, the transformer, and an output portion; and a second rectifying and smoothing circuit connected to the transformer and the switching control circuit. The switching control circuit includes a control circuit and a starter circuit. The starter circuit includes a first transistor and a second transistor each including a wide-gap semiconductor, and a resistor including a wide-gap semiconductor between a first terminal and a second terminal.

One embodiment of the present invention is a switching converter including a first transformer and a second transformer which are connected to a power supply portion; a switch connected to the first transformer and the second transformer; a switching control circuit connected to the switch; a first rectifying and smoothing circuit connected to the first transformer and an output portion; and a second rectifying and smoothing circuit connected to the second transformer and the switching control circuit. The switching control circuit includes a control circuit and a starter circuit. The starter circuit includes a first transistor and a second transistor each including a wide-gap semiconductor, and a resistor including a wide-gap semiconductor between a first terminal and a second terminal.

Note that an element included in the control circuit is formed in a first element layer, and a transistor and a resistor included in the starter circuit are formed in a second element layer. The second element layer is formed over the first element layer. The first element layer is formed using a semiconductor substrate. The semiconductor substrate included in the first element layer may be grounded and a terminal included in the second element layer may be grounded through a conductive material.

In one embodiment of the present invention, a transistor and a resistor each including a wide-gap semiconductor are used as a transistor and a resistor included in a starter circuit that controls startup of a control circuit, whereby deterioration and breakage of the starter circuit and the control circuit, which are caused by a high voltage applied from a power supply portion, can be suppressed. Furthermore, there is no need to provide a guard ring in the starter circuit, whereby a switching converter can be reduced in size.

DETAILED DESCRIPTION OF THE INVENTION

Hereinafter, embodiments of the present invention will be described in detail with reference to the accompanying drawings. Note that the present invention is not limited to the following description and it is easily understood by those skilled in the art that the modes and details can be variously changed without departing from the scope and spirit of the present invention. Accordingly, the invention should not be construed as being limited to the description of the following embodiments.

Note that functions of the "source" and "drain" may be switched in the case where transistors of different polarities are employed or in the case where the direction of a current flow changes in a circuit operation, for example. Therefore, the terms "source" and "drain" can be used to denote the drain and the source, respectively, in this specification. In addition, one of a source and a drain is referred to as a "first terminal" and the other of the source and the drain is referred to as a "second terminal" in some cases.

A source, a drain, and a gate are respectively referred to as a source electrode, a drain electrode, and a gate electrode in some cases.

Two electrodes of a diode are referred to as a "first terminal" and a "second terminal", and they can be replaced with a "first electrode" and a "second electrode".

Two terminals of a coil are referred to as a "first terminal" and a "second terminal".

Embodiment 1

A structure of a switching converter of one embodiment of the present invention will be described with reference to FIGS. 1A to 1C, FIG. 2, FIG. 3, and FIG. 4. In this embodiment, a structure of a non-isolated switching converter will be described.

Figure 1A:
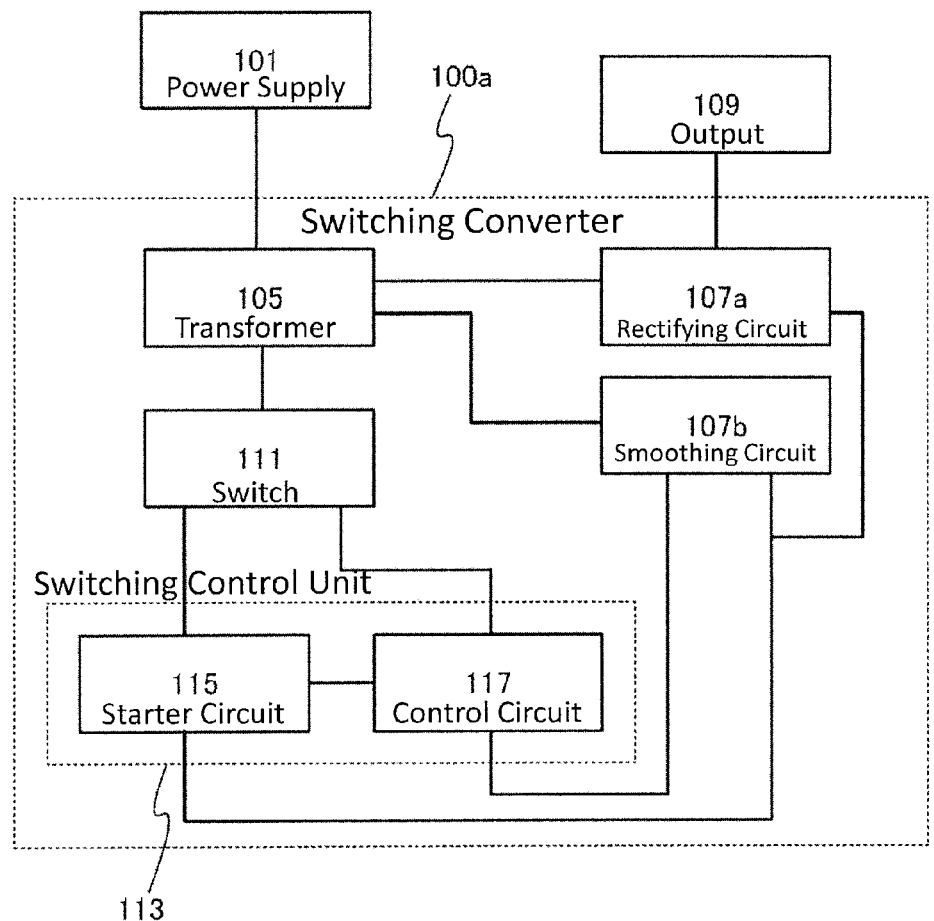
FIGS. 1A to 1C are a block diagram illustrating one mode of a switching converter, a cross-sectional diagram illustrating a structure of a transistor, and a cross-sectional diagram illustrating a structure of a resistor, respectively.

A switching converter 100a illustrated in FIG. 1A generates a constant voltage (output voltage) using a voltage (input voltage) supplied from a power supply portion 101, and outputs the constant voltage from an output portion 109.

The switching converter 100a includes a transformer 105, a rectifying and smoothing circuit 107a, a rectifying and smoothing circuit 107b, a switch 111, and a switching control circuit 113. Note that the transformer 105 is connected to the power supply portion 101. The rectifying and smoothing circuit 107a is connected to the output portion 109.

The switching control circuit 113 includes a starter circuit 115 and a control circuit 117.

The transformer 105 is connected to the rectifying and smoothing circuit 107a, the rectifying and smoothing circuit 107b, and the switch 111.

The rectifying and smoothing circuit 107a is connected to the transformer 105, the output portion 109, and the starter circuit 115. The rectifying and smoothing circuit 107b is connected to the transformer 105, the starter circuit 115, and the control circuit 117.

The starter circuit 115 is connected to the rectifying and smoothing circuit 107b, the switch 111, and the control circuit 117. The control circuit 117 is connected to the rectifying and smoothing circuit 107b, the switch 111, and the starter circuit 115.

The power supply portion 101 has a mechanism of outputting power to the output portion 109. The power supply portion 101 typically includes a power source device, such as an alternating current (AC) power source, a direct current (DC) power source, a power generation device, a primary battery, a secondary battery, or a capacitor. In the case where the power source device is an AC power source device, a rectifying and smoothing circuit is provided between the power source device and the switching converter.

The switch 111 has a function of converting a direct current output from the power supply portion 101 into a pulsed current and outputting it from the transformer 105. Switching on/off of the switch 111 makes a pulsed current to be output from the transformer. A typical example of the switch 111 is a transistor. Examples of the transistor include transistors formed with the use of a single crystal semiconductor substrate or polycrystalline semiconductor substrate formed of silicon, germanium, silicon germanium, or the like. In addition, the examples of the transistor also include a transistor formed with the use of a wide-gap semiconductor, which is to be described later, as a transistor included in the starter circuit 115.

The transformer 105 has a function of converting a voltage output from the power supply portion 101 into a desired voltage utilizing a pulsed current output from the switch 111 and outputting it to the output portion 109 and the switching control circuit 113.

A typical example of the transformer 105 is a transformer composed of a first coil, a second coil, and a magnetic core. Note that by adjusting the ratio between the numbers of windings of the first coil and the second coil which are included in the transformer, a voltage output to the output portion 109 and the switching control circuit 113 can be changed. For example, by adjusting the number of windings such that the number of windings of the second coil is smaller than the number of windings of the first coil, the transformer can be a step-down transformer by which an output voltage smaller than an input voltage is obtained. On the other hand, by adjusting the number of windings such that the number of windings of the second coil is larger than the number of windings of the first coil, the transformer can be a step-up transformer by which an output voltage higher than an input voltage is obtained.

The rectifying and smoothing circuit 107a is a circuit that rectifies and smoothes a pulsed current output from the transformer 105 and outputs it to the output portion 109. The rectifying and smoothing circuit 107a typically includes at least a rectifying element and a capacitor and may further include a resistor.

The rectifying and smoothing circuit 107b is a circuit that rectifies and smoothes a pulsed current output from the transformer 105 and outputs it to the switching control circuit 113. The rectifying and smoothing circuit 107b typically includes at least a rectifying element and a capacitor and may further include a resistor.

The transformer 105 is connected to the rectifying and smoothing circuit 107a and the rectifying and smoothing circuit 107b. Thus, a voltage output from the power supply portion 101 can be converted and output to the output portion 109 and the switching control circuit 113; therefore, there is no need to provide an additional power supply portion for operating the switching control circuit 113, which reduces the number of components.

The starter circuit 115 has a function of charging the capacitor included in the rectifying and smoothing circuit 107b using a direct current output from the rectifying and smoothing circuit 107b, so that the control circuit 117 enters an operation state quickly. That is, the starter circuit 115 has a function of controlling startup of the control circuit 117. In addition, the starter circuit 115 has a function of preventing a high current from flowing into the control circuit 117 after the control circuit 117 enters an operation state, so that damage to the control circuit 117 can be prevented. The starter circuit 115 includes a transistor and a resistor each including a wide-gap semiconductor.

A wide-gap semiconductor is a semiconductor whose band gap is 2 eV or higher, preferably 2.5 eV or higher, more preferably 3 eV or higher. Typical examples of the wide-gap semiconductor include a compound semiconductor such as gallium nitride, aluminum nitride, or indium nitride; silicon carbide; and an oxide semiconductor. Typical examples of the oxide semiconductor include an In—Ga—Zn-based oxide semiconductor, indium oxide, indium tin oxide, indium gallium oxide, indium zinc oxide, tin oxide, zinc oxide, and gallium oxide.

Here, a structure of a transistor and a structure of a resistor each including an oxide semiconductor as an example of the wide-gap semiconductor will be described with reference to FIGS. 1B and 1C.

Figure 1B:
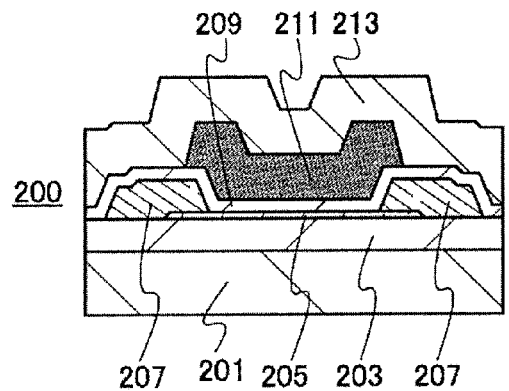

FIG. 1B is a cross-sectional diagram of a transistor 200 including an oxide semiconductor film. The transistor 200 includes an insulating film 203 over a substrate 201; an oxide semiconductor film 205 over the insulating film 203; a pair of electrodes 207 in contact with the oxide semiconductor film 205; a gate insulating film 209 in contact with the insulating film 203, the oxide semiconductor film 205, and the pair of electrodes 207; and a gate electrode 211 overlapping with the oxide semiconductor film 205 with the gate insulating film 209 provided therebetween. In addition, the transistor 200 includes an insulating film 213 covering the gate insulating film 209 and the gate electrode 211.

Figure 1C:
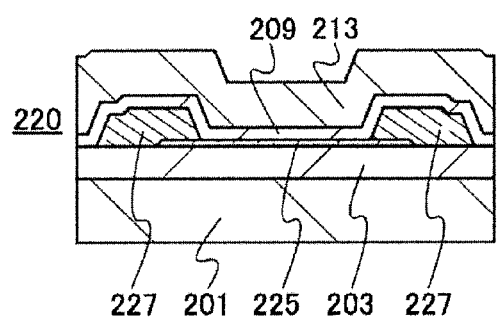

FIG. 1C is a cross-sectional diagram of a resistor 220 including an oxide semiconductor film. The resistor 220 includes the insulating film 203 over the substrate 201; an oxide semiconductor film 225 over the insulating film 203; and a pair of electrodes 227 in contact with the oxide semiconductor film 225. The resistor 220 may further include the gate insulating film 209 and the insulating film 213 which cover the oxide semiconductor film 225 and the pair of electrodes 227.

Note that details of the structures of the transistor and the resistor each including an oxide semiconductor film will be described later.

With a structure in which a channel region of a transistor is formed with a wide-gap semiconductor, even when a high voltage is applied to a source or a drain of the transistor, deterioration and breakage of the transistor can be prevented. Furthermore, with a structure in which a wide-gap semiconductor is provided between a pair of terminals of a resistor, even when a high voltage is applied to one of the pair of terminals, deterioration and breakage of the resistor can be prevented. As a result, deterioration and breakage of the switching converter can be reduced. Moreover, by forming a transistor included in a starter circuit with the use of a semiconductor (typically, a wide-gap semiconductor) that is different from a semiconductor included in an element of a control circuit, the element of the control circuit can be insulated from the transistor included in the starter circuit. Therefore, there is no need to provide a guard ring for noise removal in the starter circuit, so that the starter circuit and the switching converter including the starter circuit can be reduced in size.

The control circuit 117 is a circuit that controls on/off of the switch 111 and an operation state of the starter circuit 115.

Here, a specific circuit configuration of the switching converter 100a illustrated in FIG. 1A will be described with reference to FIG. 2.

Figure 2:
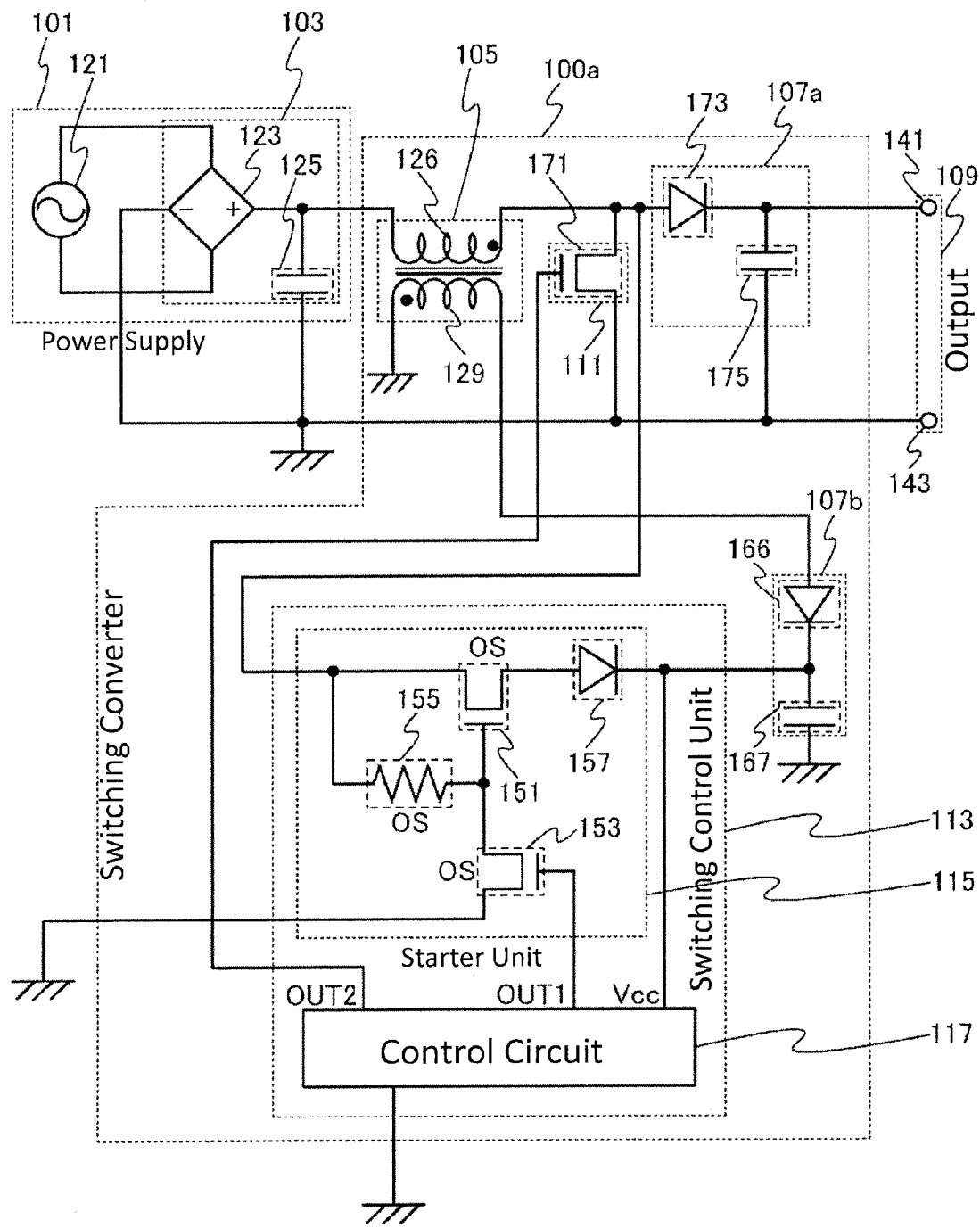
FIG. 2 is a circuit diagram illustrating one mode of the switching converter.

FIG. 2 is a circuit diagram of a boost converter (a step-up converter), which is one mode of the switching converter 100a. Note that in the circuit diagram of FIG. 2, "OS" is written beside each of transistors and a resistor which include a film of an oxide semiconductor as an example of a wide-gap semiconductor.

Here, the power supply portion 101 includes an alternating current power supply device 121 and a rectifying and smoothing circuit 103. The rectifying and smoothing circuit 103 includes a rectifying element 123 and a capacitor 125. A diode bridge is shown as an example of the rectifying element 123.

A transistor 171 is used here as the switch 111.

Here, the transformer 105 includes a pair of coils 126 and 129 and a magnetic core (not illustrated).

Here, the rectifying and smoothing circuit 107a includes a diode 173 and a capacitor 175. Here, the rectifying and smoothing circuit 107b includes a diode 166 and a capacitor 167.

Here, the starter circuit 115 includes a transistor 151 including a wide-gap semiconductor, a transistor 153 including a wide-gap semiconductor, a resistor 155 including a wide-gap semiconductor, and a diode 157.

A first terminal and a second terminal of the rectifying element 123 are connected to the alternating current power supply device 121. A third terminal of the rectifying element 123 is connected to a first terminal of the capacitor 125. A fourth terminal of the rectifying element 123 is connected to a second terminal of the capacitor 125 and a ground. The first terminal of the capacitor 125 is connected to a first terminal of the coil 126.

A second terminal of the coil 126 is connected to a first terminal of the transistor 171, a first terminal of the diode 173, a first terminal of the transistor 151, and a first terminal of the resistor 155.

A second terminal of the diode 173 is connected to a first terminal of the capacitor 175 and an output terminal 141. A second terminal of the capacitor 175 is connected to a second terminal of the transistor 171, an output terminal 143, the second terminal of the capacitor 125, the fourth terminal of the rectifying element 123, and the ground.

A gate of the transistor 171 is connected to an output terminal OUT2 of the control circuit 117.

A first terminal of the coil 129 is connected to a first terminal of the diode 166. A second terminal of the coil 129 is connected to a ground. A second terminal of the diode 166 is connected to a first terminal of the capacitor 167.

A second terminal of the transistor 151 is connected to a first terminal of the diode 157. A gate of the transistor 151 is connected to a first terminal of the transistor 153 and a second terminal of the resistor 155. A gate of the transistor 153 is connected to an output terminal OUT1 of the control circuit 117. A second terminal of the transistor 153 is connected to a ground. A second terminal of the diode 157 is connected to a terminal Vcc of the control circuit 117, the second terminal of the diode 166, and the first terminal of the capacitor 167.

The control circuit 117 is connected to a ground.

A second terminal of the capacitor 167 is connected to a ground.

A structure of a switching converter which is different from the structure illustrated in FIGS. 1A to 1C and FIG. 2 will be described with reference to FIG. 3 and FIG. 4.

Figure 3:
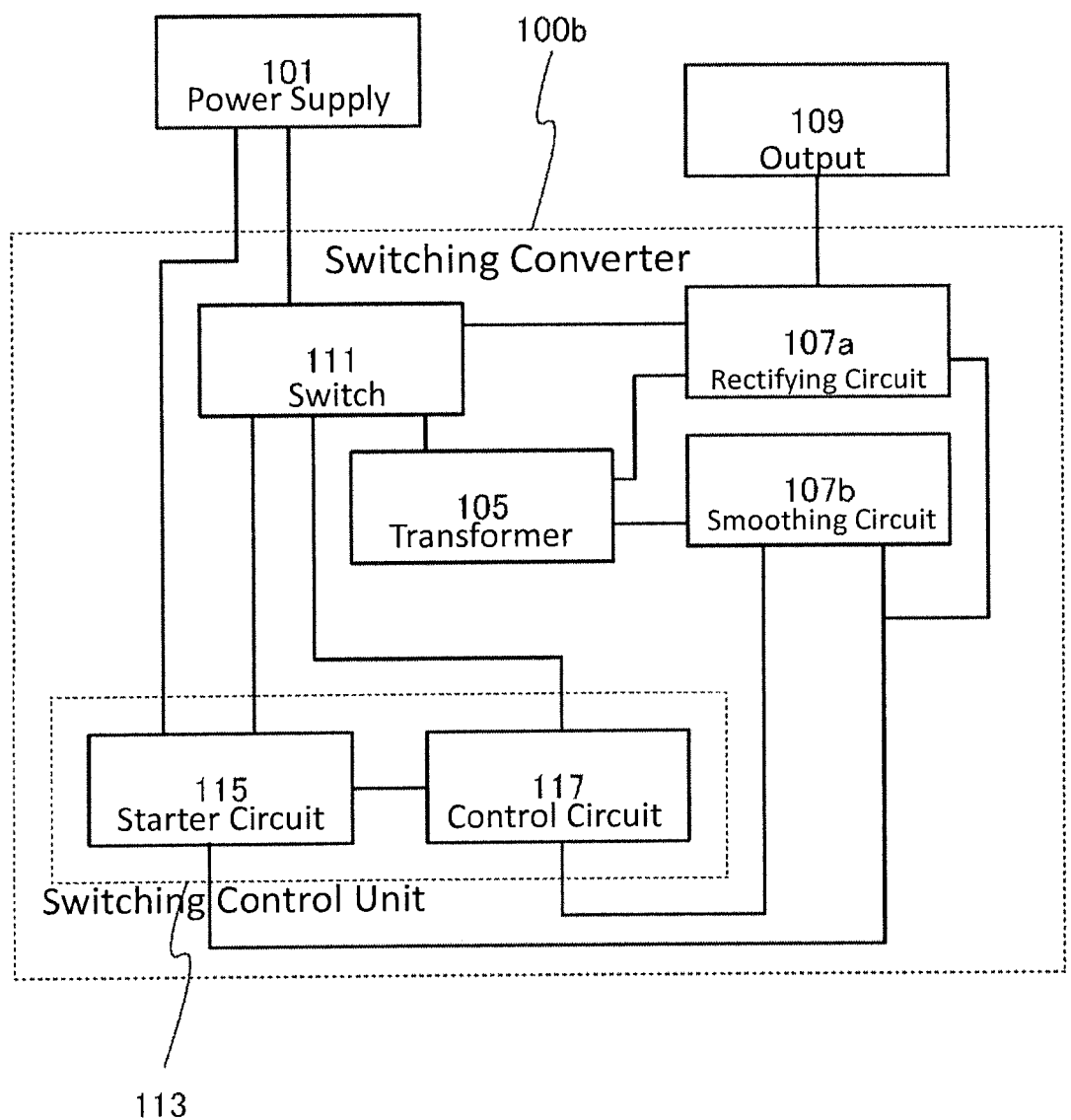
FIG. 3 is a block diagram illustrating one mode of a switching converter.

A switching converter 100b illustrated in FIG. 3 includes the switch 111 connected to the power supply portion 101; the transformer 105 connected to the switch 111; the rectifying and smoothing circuit 107a connected to the switch 111, the transformer 105, the output portion 109, and the switching control circuit 113; the rectifying and smoothing circuit 107b connected to the transformer 105 and the switching control circuit 113; and the switching control circuit 113 connected to the power supply portion 101, the switch 111, the rectifying and smoothing circuit 107a, and the rectifying and smoothing circuit 107b.

Note that a difference between the switching converter 100b illustrated in FIG. 3 and the switching converter 100a illustrated in FIG. 1A is only the connection of the switch 111 and the transformer 105; therefore, structures of circuits, the switch, and the transformer in FIG. 3 can be similar to those in FIG. 1A, and detailed description of the structures is omitted.

Here, a specific circuit configuration of the switching converter 100b illustrated in FIG. 3 will be described with reference to FIG. 4.

Figure 4:
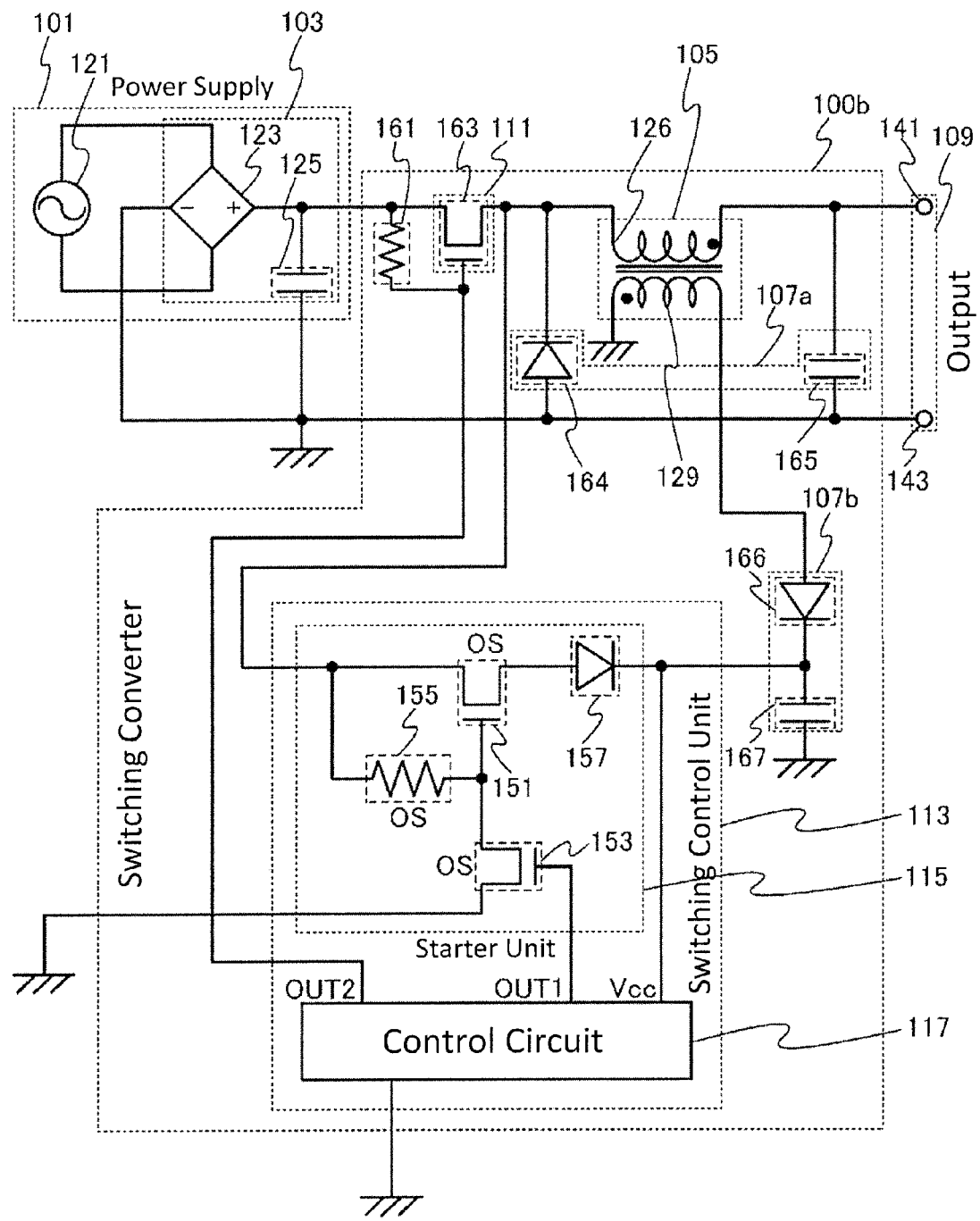
FIG. 4 is a circuit diagram illustrating one mode of the switching converter.

FIG. 4 is a circuit diagram of a back converter (a step-down converter) which is one mode of the switching converter 100b illustrated in FIG. 3. Note that in the circuit diagram of FIG. 4, "OS" is written beside each of transistors and a resistor which include a film of an oxide semiconductor as an example of a wide-gap semiconductor.

The power supply portion 101 includes the alternating current power supply device 121 and the rectifying and smoothing circuit 103.

The rectifying and smoothing circuit 103 includes the rectifying element 123 and the capacitor 125. A diode bridge is shown as an example of the rectifying element 123.

A transistor 163 is used here as the switch 111.

Here, the transformer 105 includes the pair of coils 126 and 129 and a magnetic core (not illustrated).

Here, the rectifying and smoothing circuit 107a includes a diode 164 and a capacitor 165. Here, the rectifying and smoothing circuit 107b includes the diode 166 and the capacitor 167.

Here, the starter circuit 115 includes the transistor 151 including a wide-gap semiconductor, the transistor 153 including a wide-gap semiconductor, the resistor 155 including a wide-gap semiconductor, and the diode 157.

The first terminal and the second terminal of the rectifying element 123 are connected to the alternating current power supply device 121. The third terminal of the rectifying element 123 is connected to the first terminal of the capacitor 125. The fourth terminal of the rectifying element 123 is connected to the second terminal of the capacitor 125 and a ground. The first terminal of the capacitor 125 is connected to a first terminal of a resistor 161 and a first terminal of the transistor 163.

A second terminal of the resistor 161 is connected to a gate of the transistor 163. A second terminal of the transistor 163 is connected to the first terminal of the transistor 151 and the first terminal of the resistor 155. The second terminal of the transistor 163 is connected to a first terminal of the diode 164 and the first terminal of the coil 126. The gate of the transistor 163 is connected to the output terminal OUT2 of the control circuit 117.

The first terminal of the diode 164 is connected to the first terminal of the coil 126. A second terminal of the diode 164 is connected to a second terminal of the capacitor 165 and the ground.

The first terminal of the coil 126 is connected to the first terminal of the diode 164. The second terminal of the coil 126 is connected to a first terminal of the capacitor 165 and the output terminal 141.

The first terminal of the capacitor 165 is connected to the output terminal 141. The second terminal of the capacitor 165 is connected to the output terminal 143 and the second terminal of the diode 164.

The first terminal of the coil 129 is connected to the first terminal of the diode 166. The second terminal of the coil 129 is connected to a ground.

The second terminal of the transistor 151 is connected to the first terminal of the diode 157. The gate of the transistor 151 is connected to the first terminal of the transistor 153 and the second terminal of the resistor 155. The gate of the transistor 153 is connected to the output terminal OUT1 of the control circuit 117. The second terminal of the transistor 153 is connected to a ground. The second terminal of the diode 157 is connected to the terminal Vcc of the control circuit 117, the second terminal of the diode 166, and the first terminal of the capacitor 167.

The control circuit 117 is connected to a ground.

The second terminal of the capacitor 167 is connected to a ground.

Next, an operation method of a switching converter will be described with reference to FIG. 5, FIG. 6, FIG. 7, FIG. 8, and FIG. 9. Here, the switching converter 100a illustrated in FIG. 2 is used for the description. Note that in FIG. 5, FIG. 6, FIG. 7, FIG. 8, and FIG. 9, an alternating current that is output from the power supply portion 101 to the rectifying element 123 is shown by a dashed arrow, and a direct current obtained by conversion in the rectifying element 123 is shown by a solid arrow.

Figure 5:
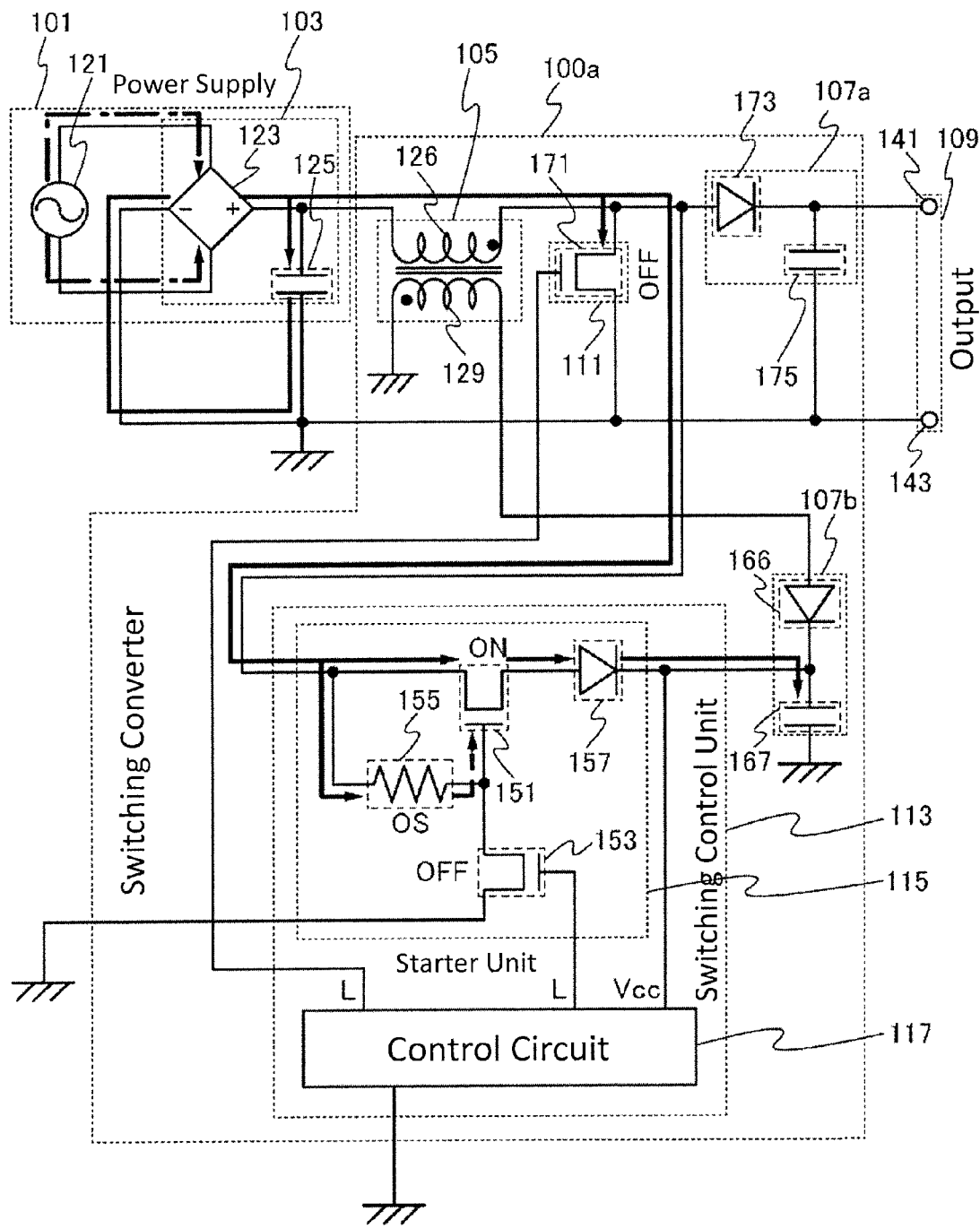
FIG. 5 is a circuit diagram illustrating operation of the switching converter.

FIG. 5 illustrates a state at the time of power supply of the power supply portion 101.

An alternating current output from the alternating current power supply device 121 in the power supply portion 101 is, in the rectifying and smoothing circuit 103, rectified by the rectifying element 123 and smoothed by the capacitor 125. Thus, a direct current is output from the rectifying and smoothing circuit 103 to the coil 126 included in the transformer 105.

The direct current flowing in the coil 126 in the transformer 105 is output to the starter circuit 115 included in the switching control circuit 113. At this time, a high potential is applied to the first terminal of the resistor 155 and the first terminal of the transistor 151 in the starter circuit 115, so that electric charges are accumulated in the resistor 155. As a result, a high potential is applied to the gate of the transistor 151 connected to the second terminal of the resistor 155, whereby the transistor 151 is turned on. Note that a direct current output to the gate of the transistor 151 via the resistor 155 is smaller than a direct current output to the resistor 155, and the direct current output to the gate of the transistor 151 is shown by a dashed arrow. Although the gate of the transistor 153 is connected to the control circuit 117, the control circuit 117 does not operate because a voltage is not applied to the terminal Vcc of the control circuit 117. Accordingly, a current is not output from the output terminal OUT1 and the output terminal OUT2 of the control circuit 117, and thus the gate of the transistor 153 and the gate of the transistor 171 have a low potential (L). Consequently, the transistors 153 and 171 are off.

When the transistor 151 is turned on, a direct current rectified by the diode 157 in the starter circuit 115 is output to the capacitor 167 in the rectifying and smoothing circuit 107b, whereby the capacitor 167 is charged.

Figure 6:
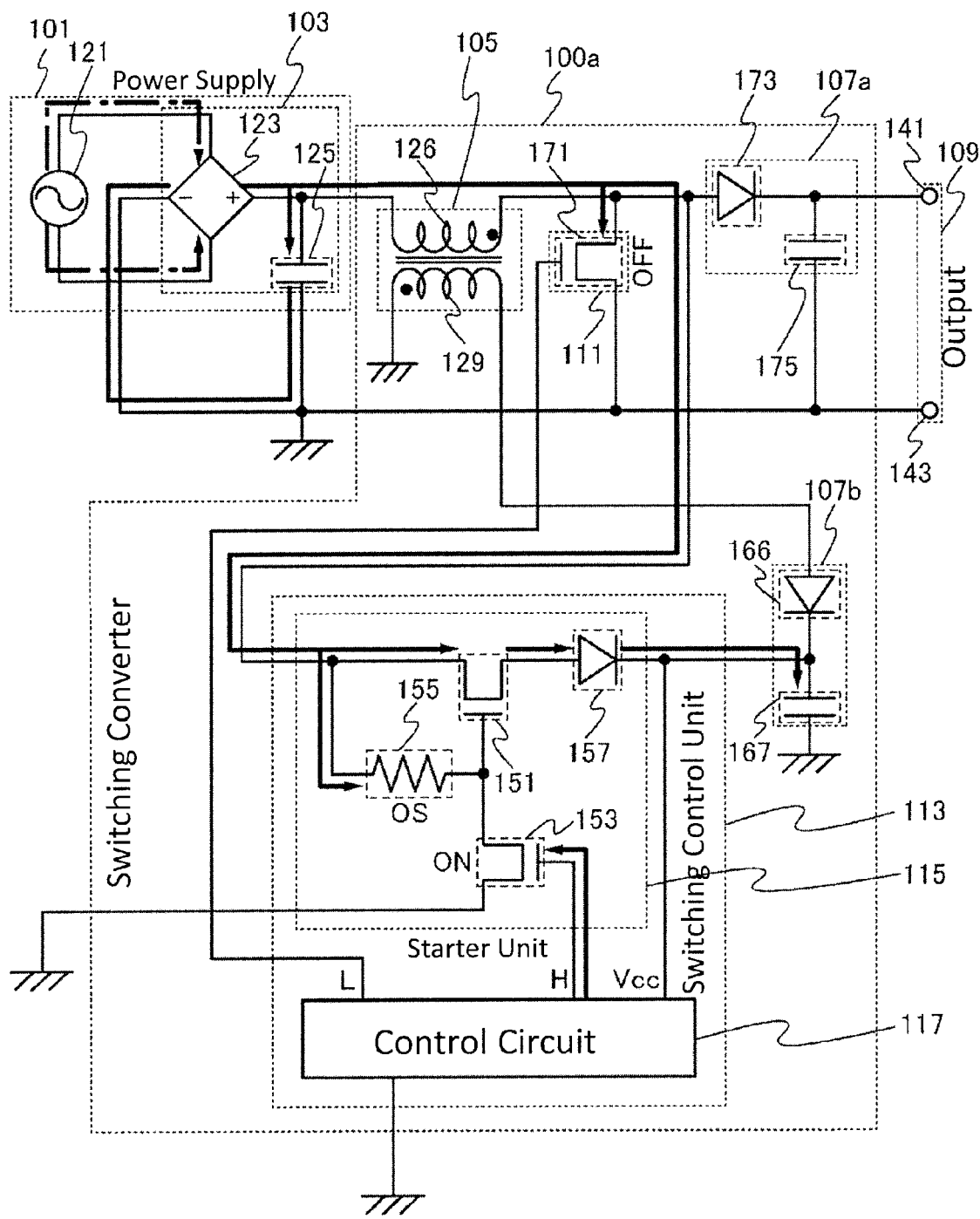
FIG. 6 is a circuit diagram illustrating operation of the switching converter.

FIG. 6 illustrates a state of startup of the control circuit 117.

When the capacitor 167 in the rectifying and smoothing circuit 107b is charged, the potential of the terminal Vcc of the control circuit 117 rises to a potential at which the control circuit 117 can operate. As a result, a current for turning on the transistor 153 in the starter circuit 115 is output from the output terminal OUT1 of the control circuit 117 and a high potential (H) is applied to the gate of the transistor 153, whereby the transistor 153 in the starter circuit 115 is turned on. Note that here, when a CLK signal that makes the transistor to be turned on/off at high speed is output from the output terminal OUT2 to the gate of the transistor 171 in the switch 111, the capacitor 167 loses the accumulated electric charges; accordingly, a low potential (L) is applied to the gate of the transistor 171 from the output terminal OUT2.

Figure 7:
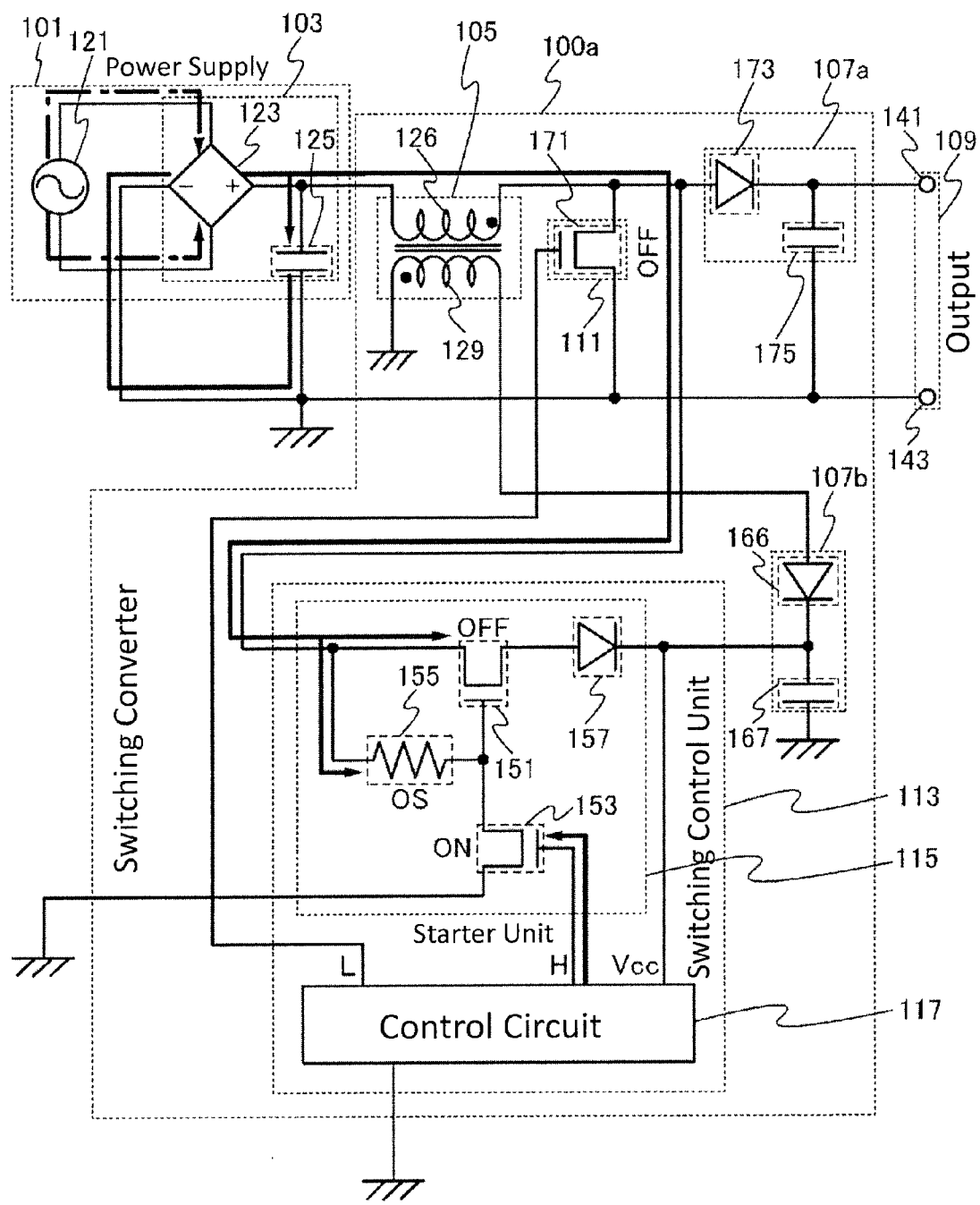
FIG. 7 is a circuit diagram illustrating operation of the switching converter.

FIG. 7 illustrates a state where the operation of the starter circuit 115 is stopped.

When the transistor 153 in the starter circuit 115 is turned on, since the second terminal of the transistor 153 is connected to a ground, the first terminal of the transistor 153 has the same potential as the ground and thus the gate of the transistor 151 has the same potential as the ground, so that the transistor 151 is turned off. As a result, a current output from the transformer 105 is interrupted by the transistor 151, whereby the operation of the starter circuit 115 is stopped.

At this time, a high potential the same as the potential of the coil 126 is applied to the first terminal of the transistor 151, and the same potential as the potential at which the control circuit 117 can operate is applied to the second terminal of the transistor 151. A high potential the same as the potential of the coil 126 is applied to the first terminal of the resistor 155 in the starter circuit 115, and the second terminal of the resistor 155 has the same potential as the ground when the transistor 153 is on because the second terminal of the transistor 153 is connected to the ground. Accordingly, by forming a high withstand voltage device by using wide-gap semiconductor (here, an oxide semiconductor film) for the transistor 151 and the resistor 155, breakage and deterioration of the transistor 151 and the resistor 155 can be suppressed. Moreover, by forming the transistor 151 with the use of a semiconductor (typically, a wide-gap semiconductor) that is different from a semiconductor included in an element of a control circuit, the element of the control circuit can be insulated from the transistor 151. Therefore, there is no need to provide a guard ring for noise removal in the starter circuit, so that the starter circuit and the switching converter including the starter circuit can be reduced in size.

Figure 8:
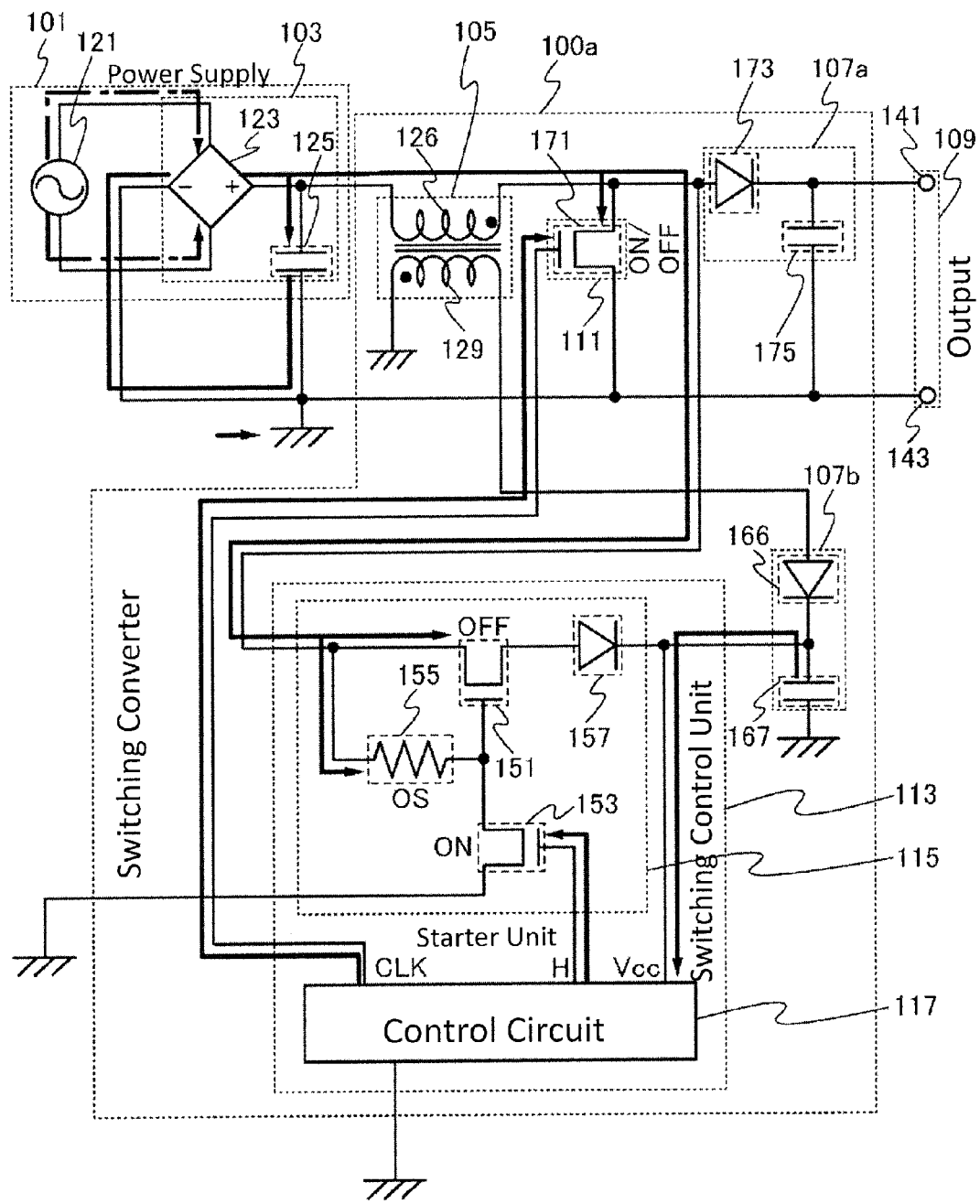
FIG. 8 is a circuit diagram illustrating operation of the switching converter.

FIG. 8 illustrates a state at the start of supplying a CLK signal to the transistor 171 in the switch 111.

When the transistor 151 in the starter circuit 115 is turned off, charging of the capacitor 167 in the rectifying and smoothing circuit 107b is stopped; however, a direct current flows from the capacitor 167 to the control circuit 117 due to the charging of the capacitor 167 in the rectifying and smoothing circuit 107b; thus, the potential of the terminal Vcc of the control circuit 117 rises to a potential at which the control circuit 117 can operate, whereby the control circuit 117 enters an operation state. As a result, a CLK signal is output from the control circuit 117 to the gate of the transistor 171 in the starter circuit 115, so that switching of the transistor 171 can be performed at high speed.

Figure 9:
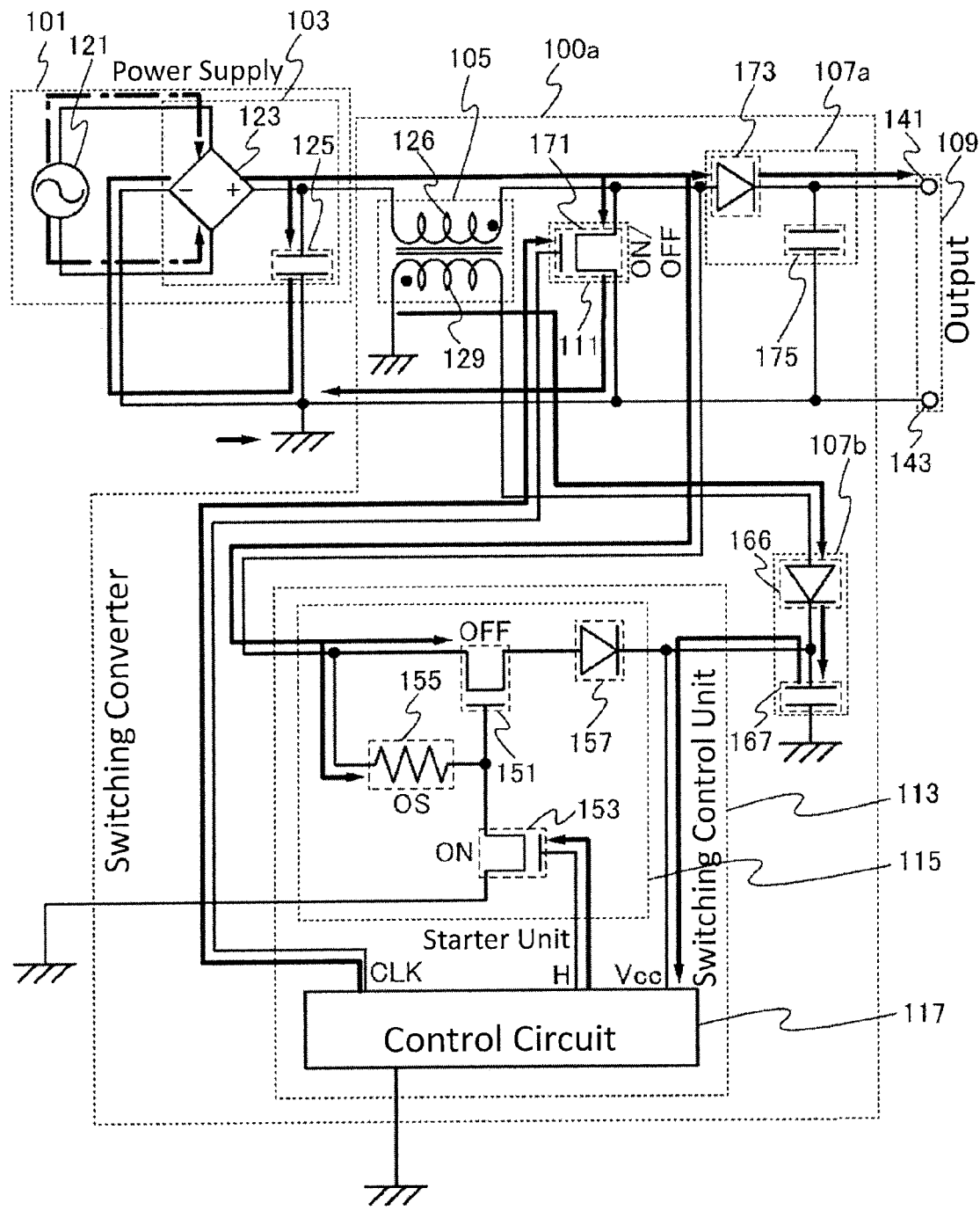
FIG. 9 is a circuit diagram illustrating operation of the switching converter.

FIG. 9 illustrates a state at the regular operation of the switching converter 100a.

By repetitive operations of turning on and off the transistor 171 in the switch 111, a pulsed direct current is supplied from the rectifying and smoothing circuit 103 to the transformer 105. As a result, a direct current is output to the rectifying and smoothing circuit 107a and the rectifying and smoothing circuit 107b. In the rectifying and smoothing circuit 107a, the current is rectified by the diode 173, smoothed by the capacitor 175, and then output to the output terminal 141 of the output portion 109. In the rectifying and smoothing circuit 107b, the current is rectified by the diode 166, smoothed by the capacitor 167, and then output to the control circuit 117. In this manner, a converted voltage can be output to the output portion 109. Similarly, a converted voltage can be output from the transformer 105 to the control circuit 117. Thus, the control circuit 117 can be operated without an additional power supply portion.

With a structure in which a channel region of a transistor included in a starter circuit is formed with a wide-gap semiconductor, even when a high voltage is applied to a source or a drain of the transistor, deterioration and breakage of the transistor can be prevented. Furthermore, with a structure in which a wide-gap semiconductor is provided between a pair of terminals of a resistor, even when a high voltage is applied to one of the pair of terminals, deterioration and breakage of the resistor can be prevented. As a result, deterioration and breakage of the switching converter can be reduced. Moreover, by forming the transistor included in the starter circuit with the use of a semiconductor (typically, a wide-gap semiconductor) that is different from a semiconductor included in an element of a control circuit, the element of the control circuit can be insulated from the transistor included in the starter circuit. Therefore, there is no need to provide a guard ring for noise removal in the starter circuit, so that the starter circuit and the switching converter including the starter circuit can be reduced in size.

Figure 10:
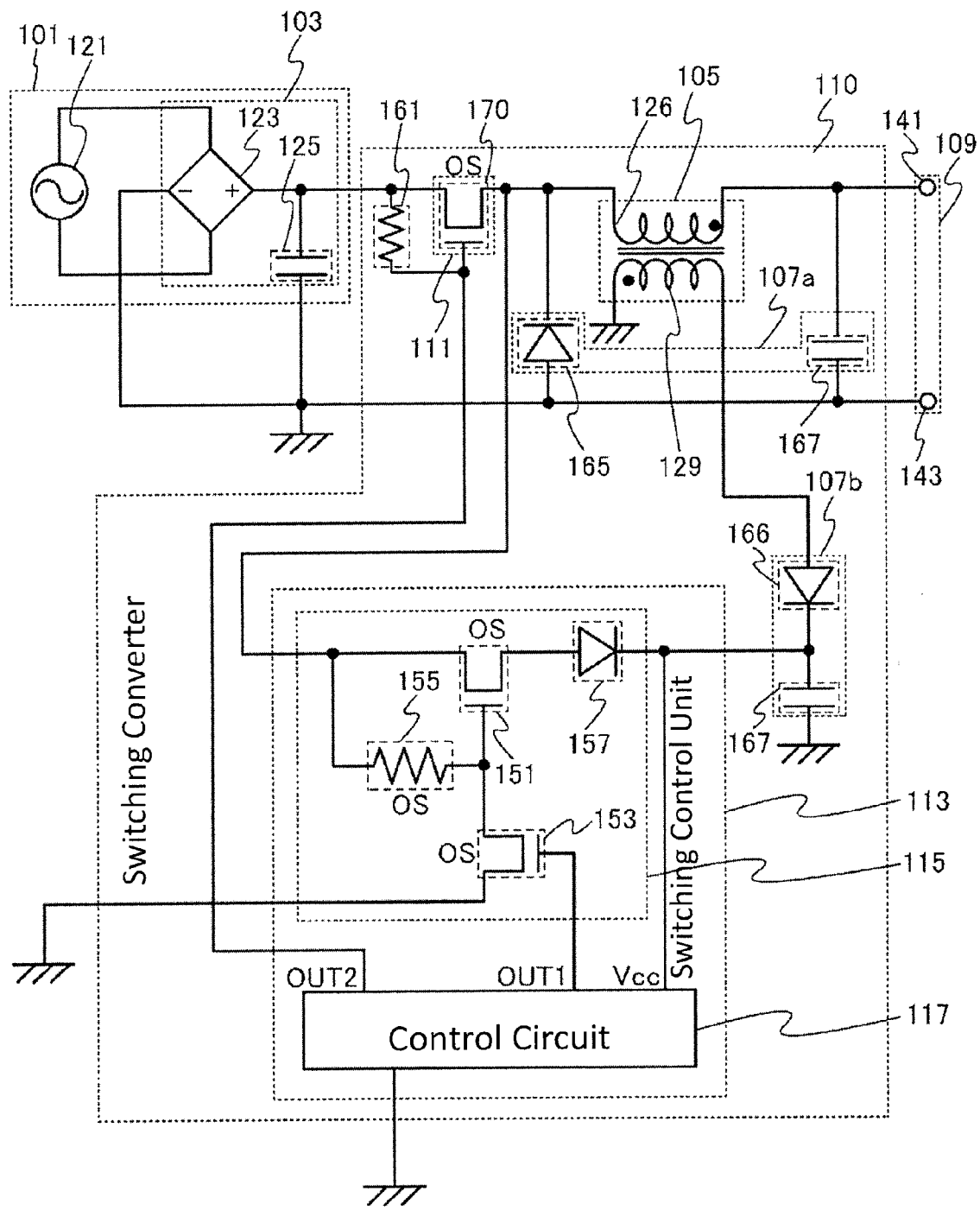
FIG. 10 is a circuit diagram illustrating one mode of the switching converter.

FIG. 10 is a circuit diagram of a switching converter 110 in which a transistor including a wide-gap semiconductor is used in the switch 111. Although description is given here using the switching converter 100b illustrated in FIG. 4, the switching converter 100a illustrated in FIG. 2 may be used as appropriate. In the circuit diagram of FIG. 10, "OS" is written beside the transistor 170 because the transistor 170 in which an oxide semiconductor film is used as an example of a wide-gap semiconductor is provided in the switch 111.

As in the starter circuit 115 included in the switching control circuit 113, the transistor 170 is formed with a wide-gap semiconductor; accordingly, the switch 111 can be provided in the switching control circuit 113. Thus, the number of components of the switching converter 110 can be reduced.

The transistor including a wide-gap semiconductor has an extremely low off-state current and can withstand a high voltage. Accordingly, by using the transistor including a wide-gap semiconductor as the transistor 170, an off-state current caused by application of a high voltage from the power supply portion can be reduced; thus, the power conversion efficiency of the switching converter can be improved. Such an improvement in the power conversion efficiency of the switching converter leads to a reduction in the power consumption of a semiconductor device in which the switching converter is used.

Embodiment 2

A structure of a switching converter of one embodiment of the present invention will be described with reference to FIG. 11 and FIG. 12. In this embodiment, a structure of an isolated switching converter will be described.

Figure 11:
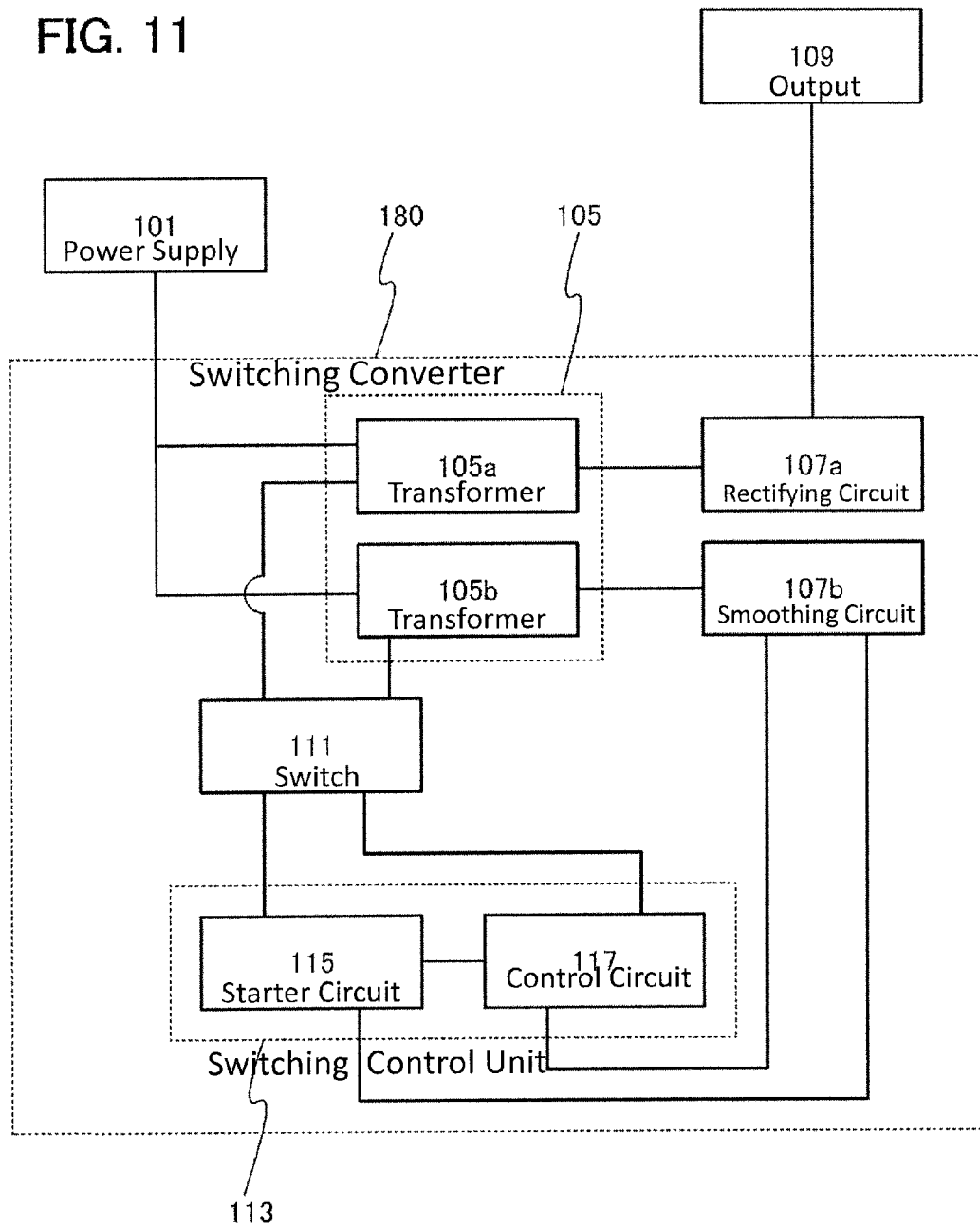
FIG. 11 is a block diagram illustrating one mode of a switching converter.

A switching converter 180 illustrated in FIG. 11 includes the transformer 105, the rectifying and smoothing circuit 107a, the rectifying and smoothing circuit 107b, the switch 111, and the switching control circuit 113. Note that the transformer 105 is connected to the power supply portion 101. The rectifying and smoothing circuit 107a is connected to the output portion 109.

The transformer 105 includes a transformer 105a and a transformer 105b. The switching control circuit 113 includes the starter circuit 115 and the control circuit 117.

The transformer 105a is connected to the rectifying and smoothing circuit 107a and the switch 111. The transformer 105b is connected to the rectifying and smoothing circuit 107b and the switch 111.

The rectifying and smoothing circuit 107a is connected to the transformer 105a and the output portion 109. The rectifying and smoothing circuit 107b is connected to the transformer 105b, the starter circuit 115, and the control circuit 117.

The starter circuit 115 is connected to the rectifying and smoothing circuit 107b, the switch 111, and the control circuit 117. The control circuit 117 is connected to the rectifying and smoothing circuit 107b, the switch 111, and the starter circuit 115.

The structures of the circuits, the switch, and the transformers of the switching converter 180 illustrated in FIG. 11 can be similar to those in FIG. 1A, and detailed description of the above-described structures is omitted.

The transformer 105a has a function of converting a voltage output from the power supply portion 101 into a desired voltage utilizing a pulsed current output from the switch 111 and outputting it to the output portion 109. A typical example of the transformer 105a is a transformer composed of a first coil, a second coil, and a magnetic core.

The transformer 105b has a function of converting a voltage output from the power supply portion 101 into a desired voltage utilizing a pulsed current output from the switch 111 and outputting it to the switching control circuit 113. A typical example of the transformer 105b is a transformer composed of the first coil, a third coil, and a magnetic core.

Since the transformer 105a includes the first coil and the second coil, and the transformer 105b includes the first coil and the third coil, a voltage output from the power supply portion 101 can be converted and output to the output portion 109 and the switching control circuit 113; therefore, there is no need to provide an additional power supply portion for operating the switching control circuit 113. Furthermore, by adjusting the ratio between the numbers of windings of the first coil, the second coil, and the third coil, a voltage output to the output portion 109 and the switching control circuit 113 can be changed. For example, by adjusting the number of windings such that the number of windings of each of the second coil and the third coil is smaller than the number of windings of the first coil, the transformer can be a step-down transformer by which an output voltage smaller than an input voltage is obtained. On the other hand, by adjusting the number of windings such that the number of windings of each of the second coil and the third coil is larger than the number of windings of the first coil, the transformer can be a step-up transformer by which an output voltage higher than an input voltage is obtained.

The starter circuit 115 has a function of charging the capacitor included in the rectifying and smoothing circuit 107b using a direct current output from the power supply portion 101, so that the control circuit 117 enters an operation state quickly. That is, the starter circuit 115 has a function of controlling startup of the control circuit 117. In addition, the starter circuit 115 has a function of preventing a high current from flowing into the control circuit 117 after the control circuit 117 enters an operation state, so that damage to the control circuit 117 can be prevented. The starter circuit 115 includes a transistor and a resistor each including a wide-gap semiconductor.

For the transistor including a wide-gap semiconductor and the resistor including a wide-gap semiconductor, the transistor 200 including an oxide semiconductor film and the resistor 220 including an oxide semiconductor film which are described in Embodiment 1 can be used, respectively.

With a structure in which a channel region of a transistor is formed with a wide-gap semiconductor, even when a high voltage is applied to a source or a drain of the transistor, deterioration and breakage of the transistor can be prevented. Furthermore, with a structure in which a wide-gap semiconductor is provided between a pair of terminals of a resistor, even when a high voltage is applied to one of the pair of terminals, deterioration and breakage of the resistor can be prevented. As a result, deterioration and breakage of the switching converter can be reduced. Moreover, by forming a transistor included in a starter circuit with the use of a semiconductor (typically, a wide-gap semiconductor) that is different from a semiconductor included in an element of a control circuit, the element of the control circuit can be insulated from the transistor included in the starter circuit. Therefore, there is no need to provide a guard ring for noise removal in the starter circuit, so that the starter circuit and the switching converter including the starter circuit can be reduced in size.

Here, a specific circuit configuration of the switching converter 180 illustrated in FIG. 11 will be described with reference to FIG. 12.

Figure 12:
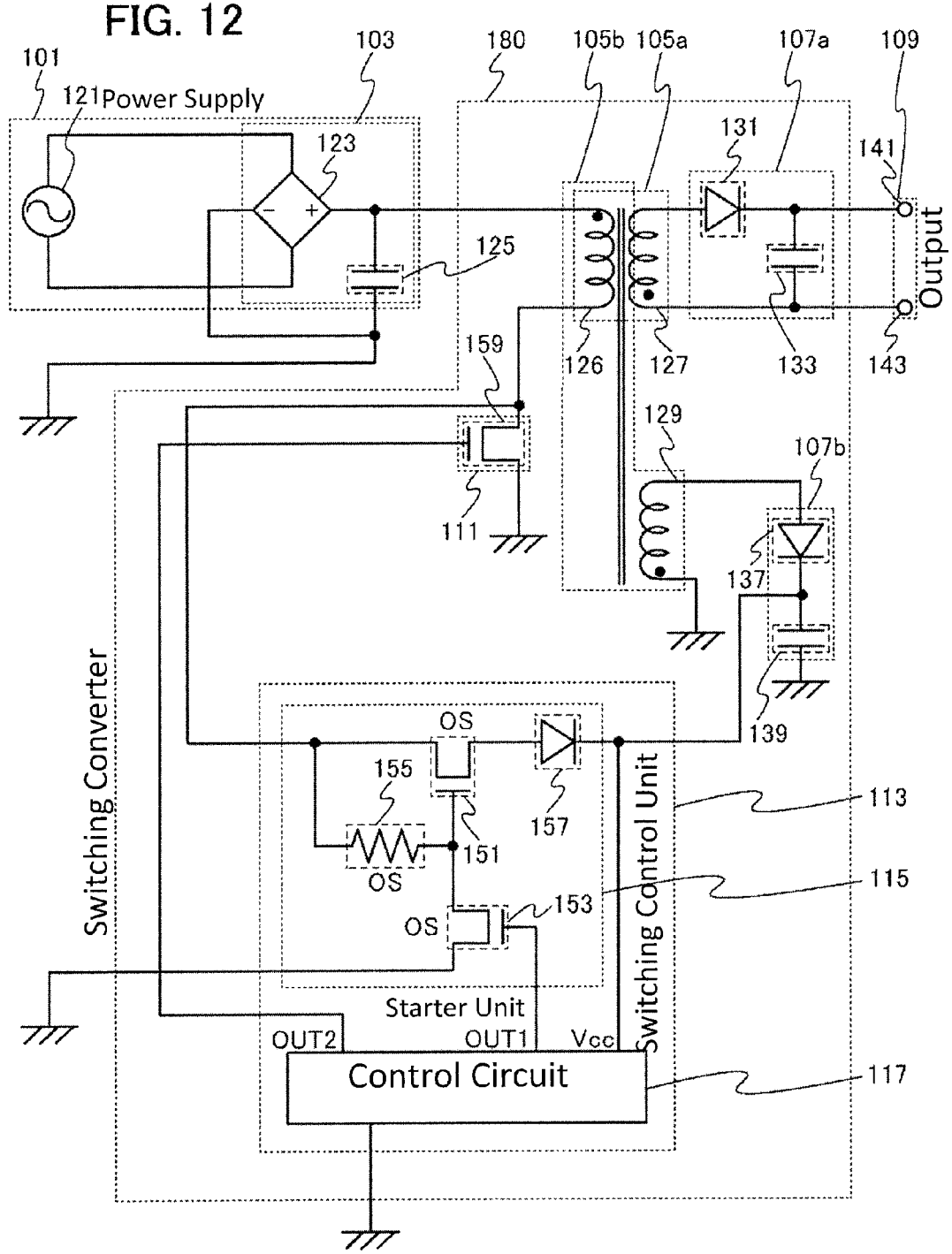
FIG. 12 is a circuit diagram illustrating the switching converter.

FIG. 12 is a circuit diagram of a fly-back converter, which is one mode of the switching converter 180. Note that in the circuit diagram of FIG. 12, "OS" is written beside each of transistors and a resistor which include a film of an oxide semiconductor as an example of a wide-gap semiconductor.

Here, the power supply portion 101 includes the alternating current power supply device 121 and the rectifying and smoothing circuit 103. The rectifying and smoothing circuit 103 includes the rectifying element 123 and the capacitor 125. A diode bridge is shown as an example of the rectifying element 123.

Here, the transformer 105a includes a pair of coils: the coil 126 and a coil 127. Here, the transformer 105b includes a pair of coils: the coil 126 and the coil 129.

Here, the rectifying and smoothing circuit 107a includes a diode 131 and a capacitor 133. Here, the rectifying and smoothing circuit 107b includes a diode 137 and a capacitor 139.

Here, the transistor 159 is used in the switch 111.

Here, the starter circuit 115 includes the transistor 151 including a wide-gap semiconductor, the transistor 153 including a wide-gap semiconductor, the resistor 155 including a wide-gap semiconductor, and the diode 157.

The first terminal and the second terminal of the rectifying element 123 are connected to the alternating current power supply device 121. The third terminal of the rectifying element 123 is connected to the first terminal of the capacitor 125. The fourth terminal of the rectifying element 123 is connected to the second terminal of the capacitor 125 and a ground. The first terminal of the capacitor 125 is connected to the first terminal of the coil 126. The second terminal of the coil 126 is connected to a first terminal of the transistor 159, the first terminal of the transistor 151, and the first terminal of the resistor 155.

The second terminal of the transistor 159 is connected to a ground. A gate of the transistor 159 is connected to the output terminal OUT2 of the control circuit 117.

A first terminal of the coil 127 is connected to a first terminal of the diode 131. A second terminal of the diode 131 is connected to a first terminal of the capacitor 133. A second terminal of the coil 127 is connected to a second terminal of the capacitor 133. The first terminal of the capacitor 133 is connected to the output terminal 141 of the input portion 109. The second terminal of the capacitor 133 is connected to the output terminal 143 of the output portion 109.

The first terminal of the coil 129 is connected to a first terminal of the diode 137. The second terminal of the coil 129 is connected to a ground. A second terminal of the diode 137 is connected to a first terminal of the capacitor 139.

A second terminal of the capacitor 139 is connected to a ground.

The second terminal of the transistor 151 is connected to the first terminal of the diode 157. The gate of the transistor 151 is connected to the first terminal of the transistor 153 and the second terminal of the resistor 155. The gate of the transistor 153 is connected to the output terminal OUT1 of the control circuit 117. The second terminal of the transistor 153 is connected to a ground. The second terminal of the diode 157 is connected to the terminal Vcc of the control circuit 117 and the first terminal of the capacitor 139.

The control circuit 117 is connected to a ground.

Next, an operation method of a switching converter will be described with reference to FIG. 13, FIG. 14, FIG. 15, FIG. 16, and FIG. 17. Note that in FIG. 13, FIG. 14, FIG. 15, FIG. 16, and FIG. 17, an alternating current that is output from the power supply portion 101 to the switching converter 180 is shown by a dashed arrow, and a direct current obtained by conversion in the rectifying element 123 is shown by a solid arrow.

Figure 13:
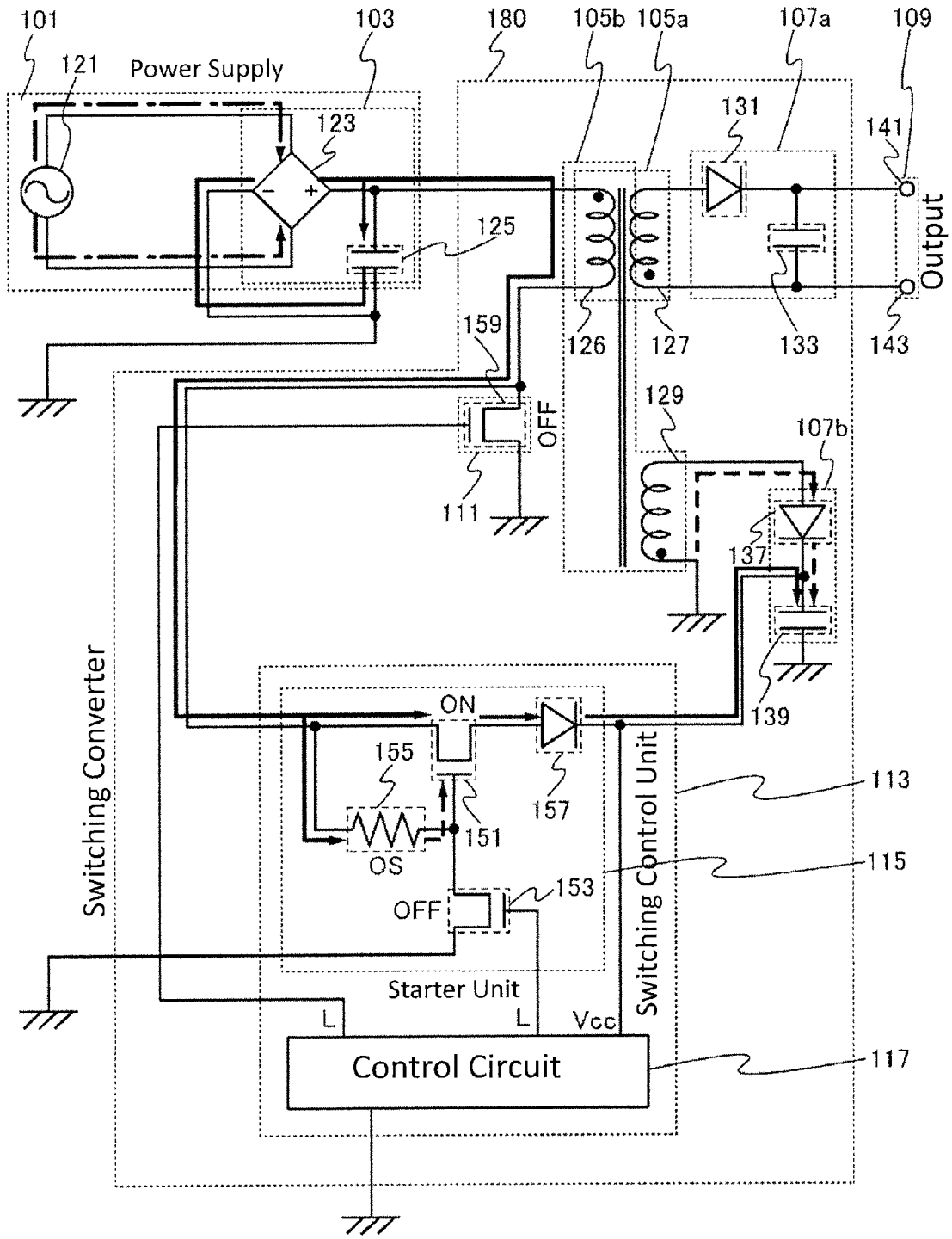
FIG. 13 is a circuit diagram illustrating operation of the switching converter.

FIG. 13 illustrates a state at the time of power supply of the power supply portion 101.

An alternating current output from the alternating current power supply device 121 in the power supply portion 101 is, in the rectifying and smoothing circuit 103, rectified by the rectifying element 123 and smoothed by the capacitor 125. Thus, a direct current is output from the rectifying and smoothing circuit 103 to the coil 126 included in the transformers 105a and 105b.

The direct current flowing in the coil 126 in the transformers 105a and 105b is output to the starter circuit 115 included in the switching control circuit 113. At this time, a high potential is applied to the first terminal of the resistor 155 and the first terminal of the transistor 151 in the starter circuit 115, and a high potential is applied to the gate of the transistor 151 connected to the second terminal of the resistor 155, whereby the transistor 151 is turned on. Note that a direct current supplied to the gate of the transistor 151 via the resistor 155 is smaller than a direct current input to the resistor 155, and the direct current supplied to the gate of the transistor 151 is shown by a dashed arrow. Furthermore, although the gate of the transistor 153 is connected to the control circuit 117, a current is not output from the output terminal OUT1 and the output terminal OUT2 because the terminal Vcc of the control circuit 117 is 0V, and thus the gate of the transistor 153 and the gate of the transistor 159 have a low potential (L). Consequently, the transistors 153 and 159 are off.

When the transistor 151 is turned on, a direct current rectified by the diode 157 in the starter circuit 115 is output to the capacitor 139 in the rectifying and smoothing circuit 107b, whereby the capacitor 139 is charged.

Note that a dashed arrow denotes a current flowing from the transformer 105b to the capacitor 139 in the rectifying and smoothing circuit 107b. Although a voltage is generated in the transformer 105b including the coil 126 and the coil 129, the voltage is low, and the current flowing from the transformer 105b to the capacitor 139 is denoted by a dashed arrow.

Figure 14:
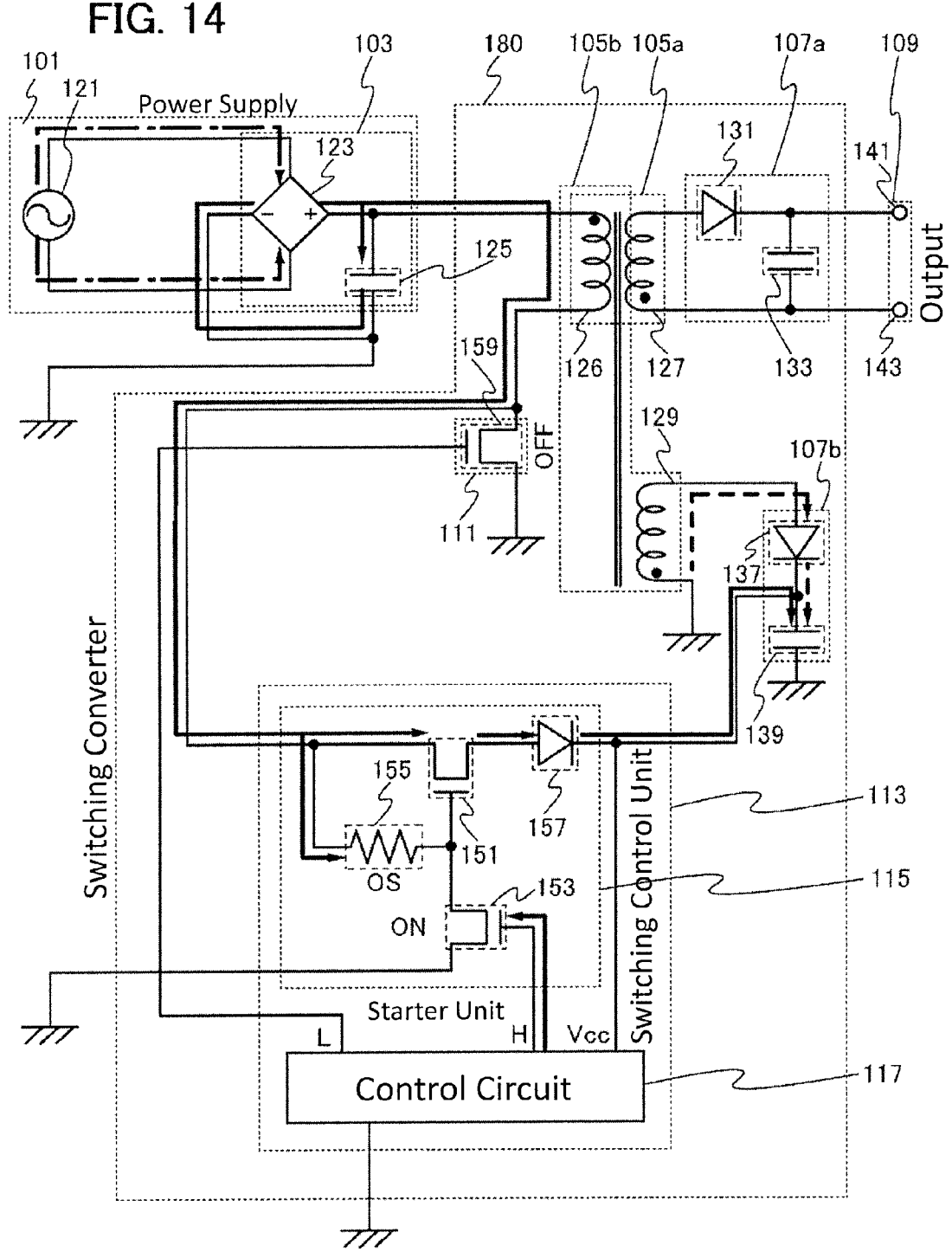
FIG. 14 is a circuit diagram illustrating operation of the switching converter.

FIG. 14 illustrates a state of startup of the control circuit 117.

When the capacitor 139 in the rectifying and smoothing circuit 107b is charged, the potential of the terminal Vcc of the control circuit 117 rises to a potential at which the control circuit 117 can operate. As a result, a current for turning on the transistor 153 in the starter circuit 115 is output from the output terminal OUT1 of the control circuit 117 to the gate of the transistor 153 and a high potential (H) is applied to the gate of the transistor 153, whereby the transistor 153 in the starter circuit 115 is turned on. Note that here, when a CLK signal that makes the transistor 159 to be turned on/off at high speed is output from the output terminal OUT2 to the gate of the transistor 159 in the switch 111, the capacitor 139 loses the accumulated electric charges; accordingly, the gate of the transistor 159 has a low potential (L).

Figure 15:
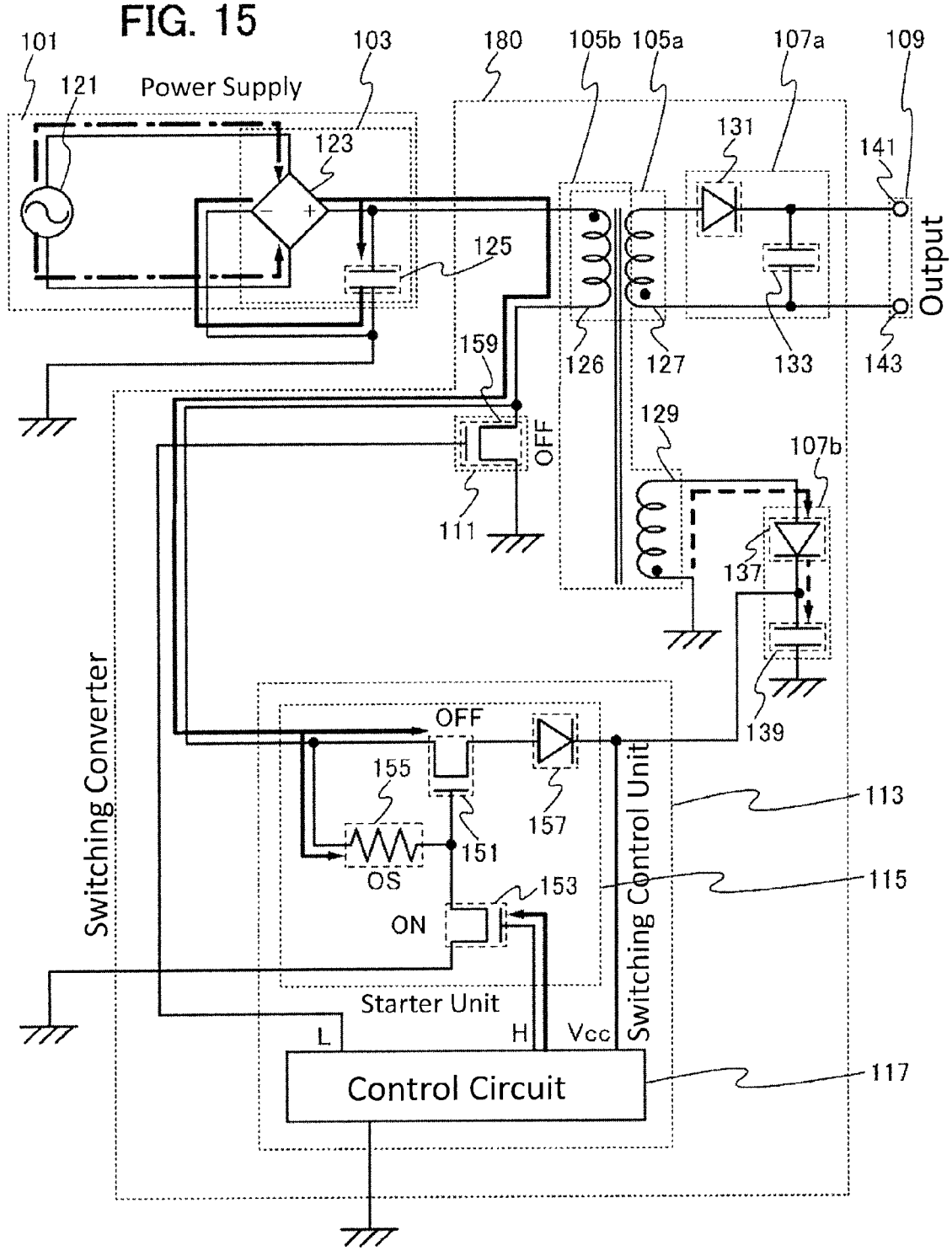
FIG. 15 is a circuit diagram illustrating operation of the switching converter.

FIG. 15 illustrates a state where the operation of the starter circuit 115 is stopped.

When the transistor 153 in the starter circuit 115 is turned on, since the second terminal of the transistor 153 is connected to the ground, the first terminal of the transistor 153 has the same potential as the ground and thus the gate of the transistor 151 has the same potential as the ground, so that the transistor 151 is turned off. As a result, a current output from the transformer 105a is interrupted by the transistor 151, whereby the operation of the starter circuit 115 is stopped.

At this time, a high potential the same as the potential of the coil 126 is applied to the first terminal of the transistor 151, and the same potential as the potential at which the control circuit 117 can operate is applied to the second terminal of the transistor 151. A high potential the same as the potential of the coil 126 is applied to the first terminal of the resistor 155 in the starter circuit 115, and the second terminal of the resistor 155 has the same potential as the ground when the transistor 153 is on because the second terminal of the transistor 153 is connected to the ground. Accordingly, by forming a device by using a high withstand voltage wide-gap semiconductor (here, an oxide semiconductor film) for the transistor 151 and the resistor 155, breakage and deterioration of the transistor 151 and the resistor 155 can be suppressed. Moreover, by forming the transistor 151 with the use of a semiconductor (typically, a wide-gap semiconductor) that is different from a semiconductor included in an element of a control circuit, the element of the control circuit can be insulated from the transistor 151. Therefore, there is no need to provide a guard ring for noise removal in the starter circuit, so that the starter circuit and the switching converter including the starter circuit can be reduced in size.

Figure 16:
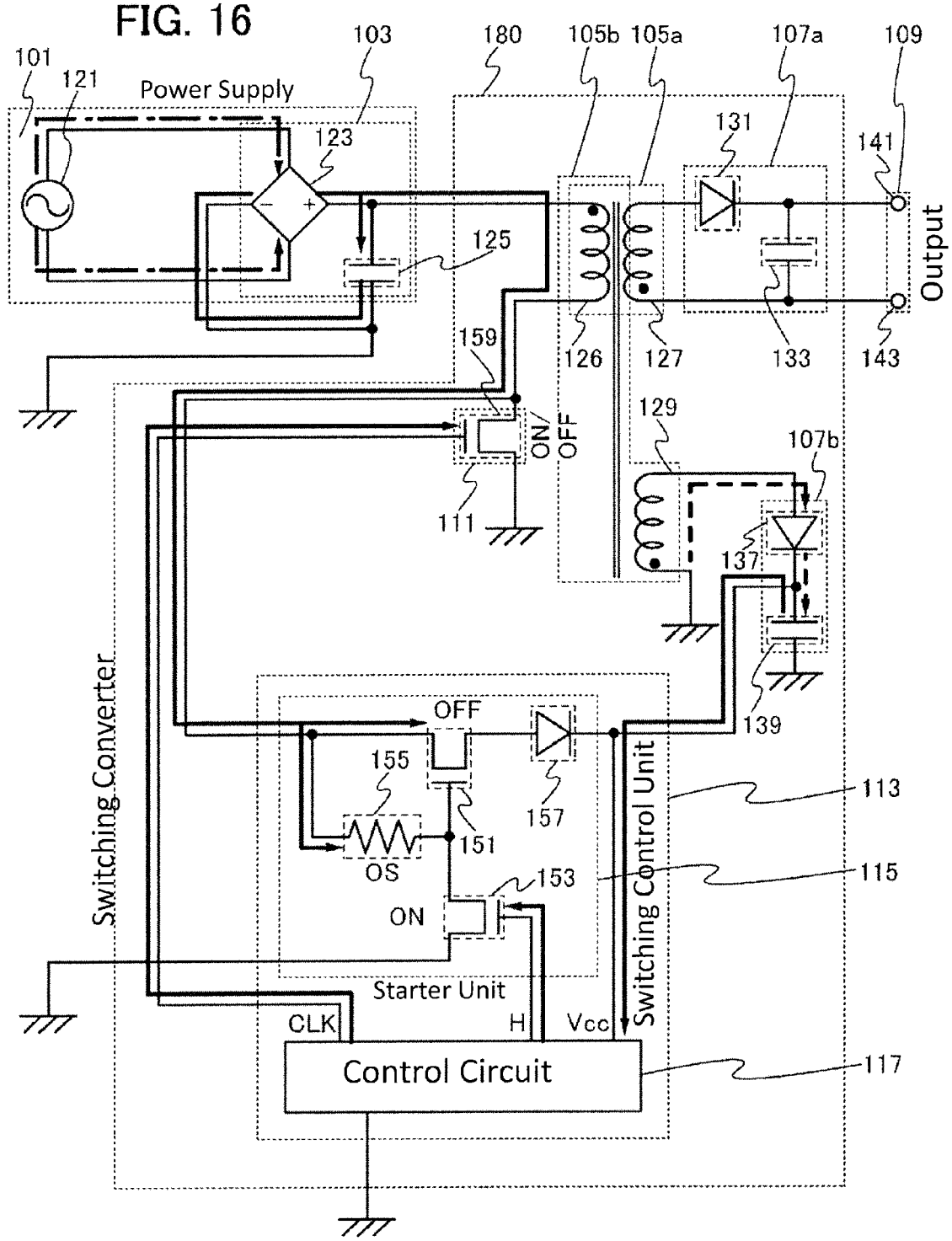
FIG. 16 is a circuit diagram illustrating operation of the switching converter.

FIG. 16 illustrates a state at the start of supplying a CLK signal to the transistor 159 in the switch 111.

When the transistor 151 in the starter circuit 115 is turned off, charging of the capacitor 139 in the rectifying and smoothing circuit 107b is stopped; however, a direct current flows from the capacitor 139 to the control circuit 117 due to the charging of the capacitor 139 in the rectifying and smoothing circuit 107b; thus, the potential of the terminal Vcc of the control circuit 117 rises to a potential at which the control circuit 117 can operate, whereby the control circuit 117 enters an operation state. As a result, a CLK signal is output from the control circuit 117 to the gate of the transistor 159 in the starter circuit 115, so that switching of the transistor 159 can be performed at high speed.

Figure 17:
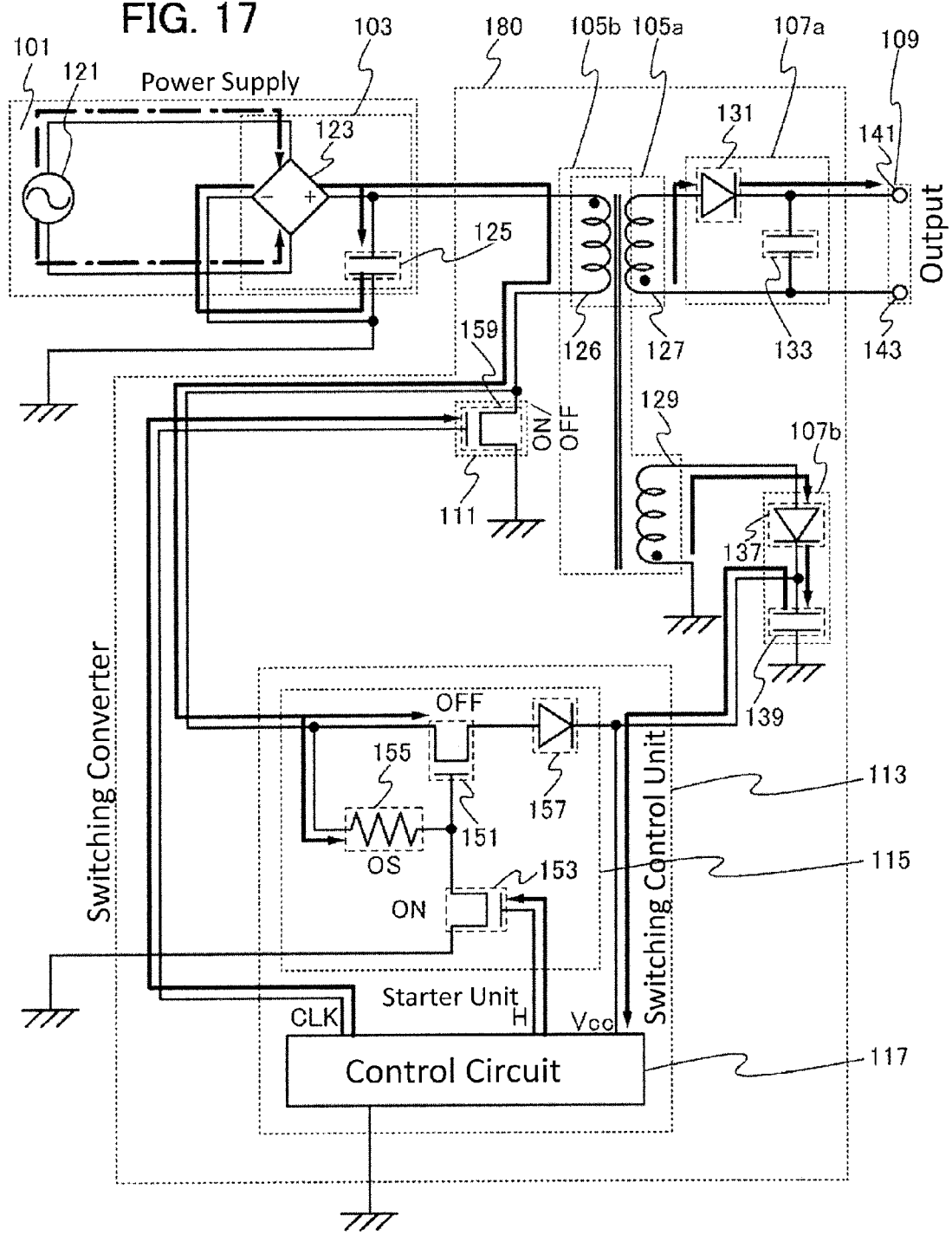
FIG. 17 is a circuit diagram illustrating operation of the switching converter.

FIG. 17 illustrates a state at the regular operation of the switching converter 180.

By repetitive operations of turning on and off the transistor 159 in the switch 111, a pulsed direct current is supplied from the rectifying and smoothing circuit 103 to the transformers 105a and 105b. As a result, a direct current is output to the rectifying and smoothing circuit 107a and the rectifying and smoothing circuit 107b. In the rectifying and smoothing circuit 107a, the current is rectified by the diode 131, smoothed by the capacitor 133, and then output to the output terminals 141 and 143 of the output portion 109. In the rectifying and smoothing circuit 107b, the current is rectified by the diode 137, smoothed by the capacitor 139, and then output to the control circuit 117. In this manner, a converted voltage can be output from the transformer 105a to the output portion 109. Similarly, a converted voltage can be output from the transformer 105b to the control circuit 117. Thus, the control circuit 117 can be operated without an additional power supply portion.

Figure 18:
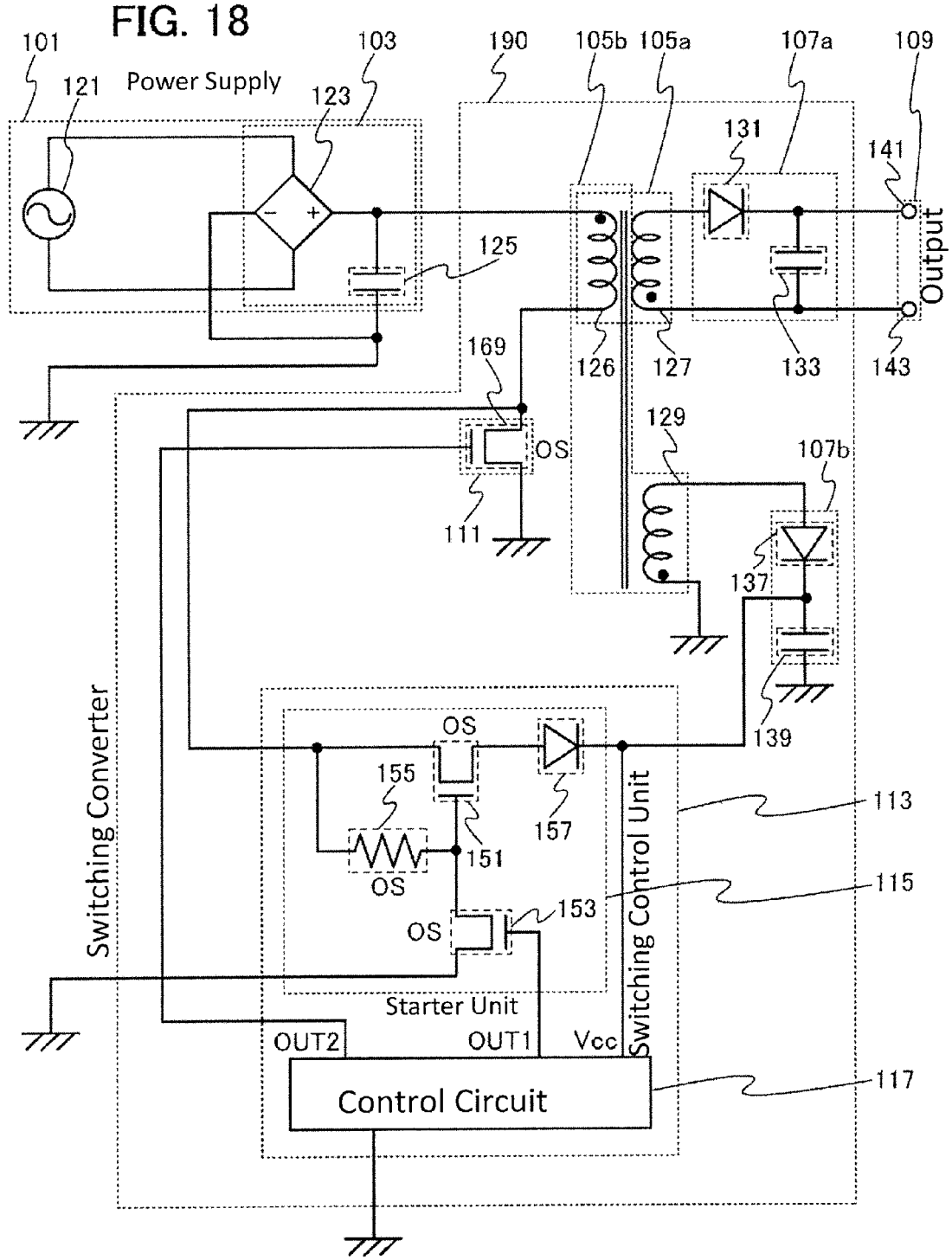
FIG. 18 is a circuit diagram illustrating one mode of a switching converter.

FIG. 18 is a circuit diagram of a switching converter 190 in which a transistor including a wide-gap semiconductor is used in the switch 111. In the circuit diagram of FIG. 18, "OS" is written beside the transistor 169 because the transistor 169 in which an oxide semiconductor film is used as an example of a wide-gap semiconductor is provided in the switch 111.

As in the starter circuit 115 included in the switching control circuit 113, the transistor 169 is formed with a wide-gap semiconductor; accordingly, the switch 111 can be provided in the switching control circuit 113. Thus, the number of components of the switching converter 160 can be reduced.

By using the transistor including a wide-gap semiconductor as the transistor 170, an off-state current caused by application of a high voltage from the power supply portion can be reduced; thus, the power conversion efficiency of the switching converter can be improved. Such an improvement in the power conversion efficiency of the switching converter leads to a reduction in the power consumption of a semiconductor device in which the switching converter is used.

Although a fly-back converter is described as an example of an insulated switching converter in this embodiment, a forward converter, a half-bridge converter, or a full-bridge converter can be used as appropriate.

This embodiment can be implemented by being combined as appropriate with any of the other embodiments.

Embodiment 3

Figure 19A:
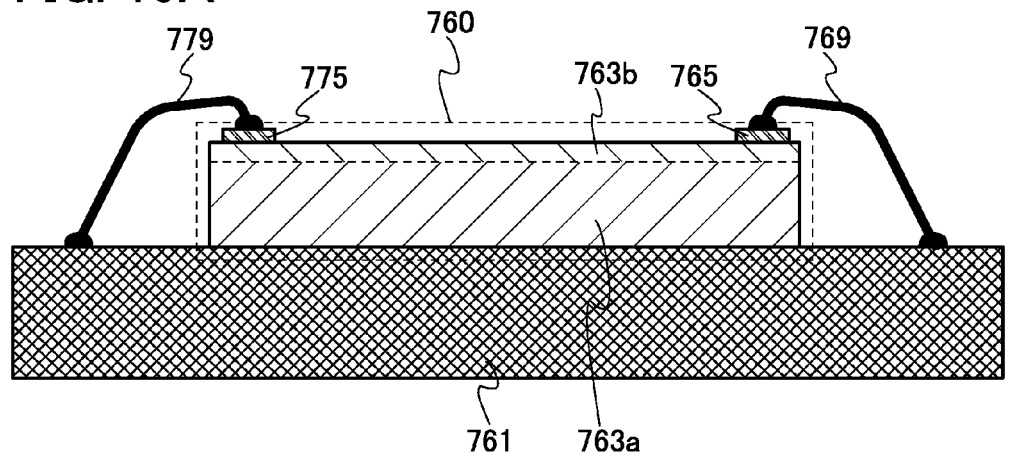
FIGS. 19A and 19B are cross-sectional diagrams illustrating one mode of a switching converter.
Figure 19B:
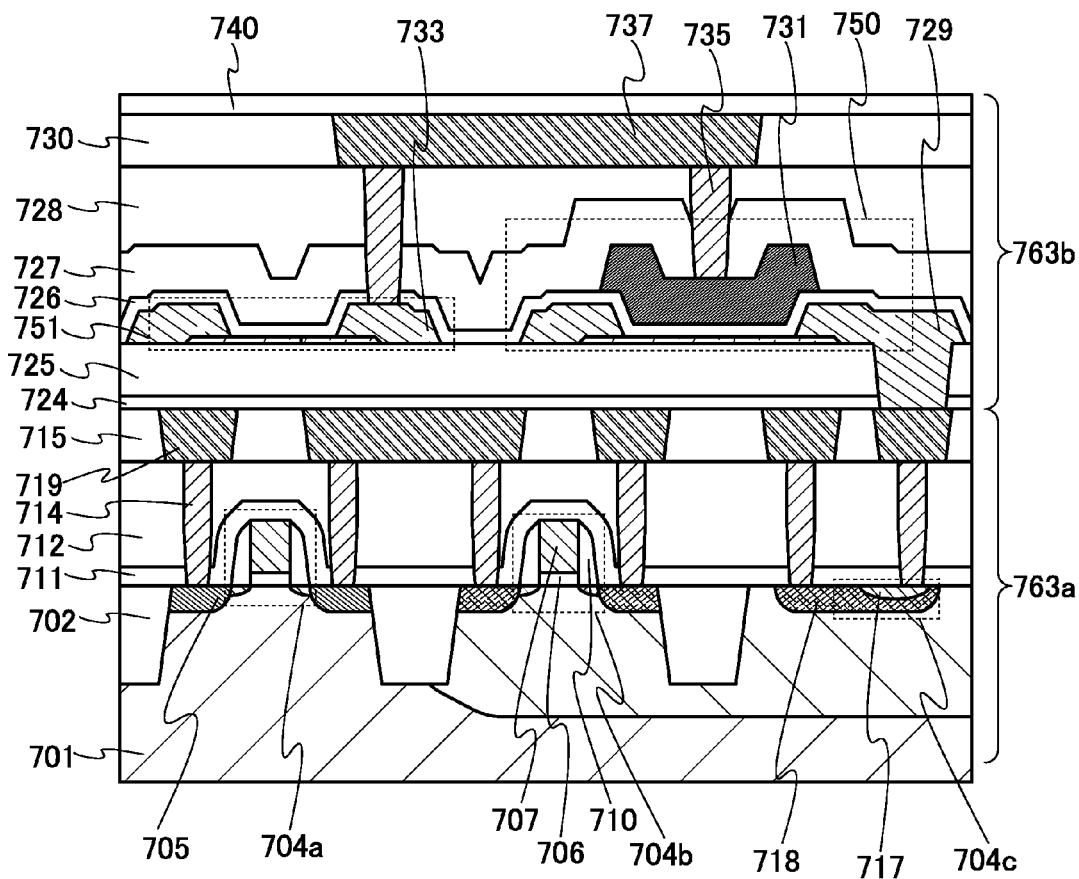

In this embodiment, a structure of the switching control circuit 113 included in the switching converter 180 will be described with reference to FIGS. 19A and 19B. FIGS. 19A and 19B are cross-sectional diagrams of a CMOS (complementary metal oxide semiconductor) circuit which includes the transistor 151, the transistor 153, the resistor 155, the diode 157, and the control circuit 117 in the switching control circuit 113 illustrated in FIG. 12.

FIG. 19A is the cross-sectional diagram of a switching control circuit 760. The switching control circuit 760 including the starter circuit 115 and the control circuit 117 is provided over a grounded member 761. The switching control circuit 760 includes an element layer 763a and an element layer 763b. The element layer 763a includes a transistor and a diode (typically, the diode 157 included in the starter circuit 115 in Embodiment 1 and Embodiment 2) which are formed using a semiconductor substrate, and the like. The element layer 763b includes transistors and a resistor each including a wide-gap semiconductor (typically, the transistor 151, the transistor 153, and the resistor 155 included in the starter circuit 115 in Embodiment 1 and Embodiment 2) provided over the element layer 763a.

A terminal 765 and a terminal 775 are formed over the element layer 763b. The terminals 765 and 775 are connected to the grounded member 761 through the conductive materials 769 and 779, respectively. The terminals 765 and 775 are formed with aluminum or an aluminum alloy. Here, thin metal wires formed using gold, an alloy containing gold, copper, or an alloy containing copper are used as the conductive materials 769 and 779.

FIG. 19B is a cross-sectional diagram obtained by enlarging a part of the switching control circuit 760. For a semiconductor substrate 701 provided in the element layer 763a, a single crystal semiconductor or a polycrystalline semiconductor formed with silicon, germanium, silicon germanium, silicon carbide, or gallium arsenide is preferably used. A transistor formed with a single crystal semiconductor can operate at high speed easily. On the other hand, a transistor 750 and a resistor 751 provided in the element layer 763b each include a wide-gap semiconductor. Accordingly, even when a high voltage is applied to the transistor 750 and the resistor 751, deterioration and breakage of the transistor 750 and the resistor 751 can be suppressed. With the use of a wide-gap semiconductor for a channel region of the transistor 750, an off-state current of the transistor 750 can be reduced, so that power loss of the switching converter can be small and a reduction in the power conversion efficiency of the switching converter can be prevented.

An element included in the starter circuit 115 illustrated in FIG. 12 is formed in the element layer 763b. In a regular operation state of the switching converter 180, a high potential and a low potential are alternately applied to the first terminal of the resistor 155 in accordance with on/off of the switch 111. As a result, the potential of the first terminal of the transistor 153 is varied up and down because the first terminal is connected to the second terminal of the resistor 155. Here, since the transistor 153 is on, noise is generated in a ground to which the transistor 153 is connected. When this ground and a ground to which the control circuit 117 is connected are directly connected, noise is input to the control circuit 117, whereby a malfunction of the control circuit 117 occurs. On the other hand, in the switching control circuit 760 illustrated in FIGS. 19A and 19B, the element layer 763a is directly connected to the grounded member 761. Alternatively, the element layer 763a is electrically connected to the grounded member 761 through the conductive material. The element layer 763b is electrically connected to the grounded member 761 through the conductive materials 769 and 779. The grounded member 761 is not in direct contact with both of the element layer 763a in which the control circuit 117 is formed and the element layer 763b in which the transistor 153 is formed; at least one of the element layer 763a and the element layer 763b is electrically connected to the grounded member 761 through the conductive material. Here, the element layer 763b is electrically connected to the grounded member 761 through the conductive materials 769 and 779. Therefore, transmission of noise generated in the transistor 153 to the control circuit 117 can be suppressed as compared with the case where the control circuit 117 and the transistor 153 are formed over the same semiconductor substrate.

The transistor 704a and the transistor 704b included in the element layer 763a are an n-channel transistor (NMOSFET) and a p-channel transistor (PMOSFET). Here, an n-channel transistor is used as the transistor 704a and a p-channel transistor is used as the transistor 704b. In the example illustrated in FIG. 19B, the transistors 704a and 704b are electrically isolated from other elements by a shallow trench isolation (STI) 702. The use of the STI 702 can reduce the generation of a bird's beak in an element isolation region, which is caused in an LOCOS element isolation method, and can reduce the size of the element isolation region. On the other hand, in a semiconductor device that is not required to be structurally miniaturized or downsized, the STI 702 is not necessarily formed, and an element isolation means such as LOCOS can be used.

The transistors 704a and 704b each include a channel formation region provided in the semiconductor substrate 701, impurity regions 705 (also referred to as a source region and a drain region) provided such that the channel formation region is provided therebetween, a gate insulating film 706 provided over the channel formation region, and a gate electrode 707 provided over the gate insulating film 706 so as to overlap with the channel formation region. The gate electrode 707 can be a single layer or a multilayer. Note that the gate electrode 707 may have a stacked structure of a first conductive film formed of a first material for improving processing accuracy and a second conductive film formed of a second material for reducing resistance.

Furthermore, contact plugs 714 are connected to the impurity regions 705 provided in the semiconductor substrate 701. Here, the contact plugs 714 also function as a source electrode and a drain electrode of the transistors 704a and 704b. In addition, impurity regions which are different from the impurity regions 705 are provided between the impurity regions 705 and the channel region. The impurity regions function as LDD regions or extension regions for controlling the distribution of an electric field in the vicinity of the channel formation region, depending on the concentration of an impurity introduced thereto. Sidewall insulating films 710 are provided on sidewalls of the gate electrodes 707. By using the sidewall insulating films 710, the LDD regions or extension regions can be formed.

The transistor 704a and the transistor 704b are covered with an insulating film 711. The insulating film 711 can function as a protection film and can prevent impurities from entering the channel formation region from the outside. In addition, when the insulating film 711 is formed using a material such as silicon nitride by a CVD method, in the case where single crystal silicon is used for the channel formation region, dehydrogenation can be performed by heat treatment. When an insulating film having tensile stress or compressive stress is used as the insulating film 711, distortion can be caused in the semiconductor material in the channel formation region. By subjecting a silicon material in the channel formation region to tensile stress in the case of an n-channel transistor or subjecting a silicon material in the channel formation region to compressive stress in the case of a p-channel transistor, the mobility of the transistor can be improved.

A diode 704c has a PN junction of an impurity region 717 and an impurity region 718, one of which is a p-type impurity region and the other of which is an n-type impurity region. The impurity region 717 and the impurity region 718 can be formed at the same time as formation of the impurity regions of the transistors 704a and 704b. The contact plugs 714 are connected to the impurity region 717 and the impurity region 718 in the diode 704c.

The element layer 763b includes a barrier film 724 in contact with the element layer 763a, an insulating film 725 over the barrier film 724, and the transistor 750 and the resistor 751 over the insulating film 725.

The barrier film 724 is preferably formed with an insulating film that has a blocking effect against hydrogen, water, and oxygen. Typically, an aluminum oxide film is used.

The insulating film 725 is preferably formed using an oxide insulating film from which part of oxygen is released by heating. The oxide insulating film from which part of oxygen is released by heating is preferably an oxide insulating film that contains oxygen at a proportion exceeding the stoichiometric proportion. The oxide insulating film from which part of oxygen is released by heating can diffuse oxygen into the oxide semiconductor film by heating. Typical examples of the insulating film 725 are films of silicon oxide, silicon oxynitride, silicon nitride oxide, gallium oxide, hafnium oxide, yttrium oxide, aluminum oxide, aluminum oxynitride, and the like.

The thickness of the insulating film 725 is greater than or equal to 50 nm, preferably greater than or equal to 200 nm and less than or equal to 3000 nm, more preferably greater than or equal to 300 nm and less than or equal to 1000 nm. With use of the thick insulating film 725, the amount of oxygen released from the insulating film 725 can be increased, and the interface state at an interface between the insulating film 725 and an oxide semiconductor film to be formed later can be reduced.

Here, "to release part of oxygen by heating" means that the amount of released oxygen is greater than or equal to $1.0 \times 10^{18}$ atoms/cm$^3$, preferably greater than or equal to $3.0 \times 10^{20}$ atoms/cm$^3$ in thermal desorption spectroscopy (TDS) on an oxygen atom basis.

In the above structure, the insulating film from which oxygen is released by heating may be oxygen-excess silicon oxide ($SiO_X(X>2)$). In the oxygen-excess silicon oxide ($SiO_X(X>2)$), the number of oxygen atoms per unit volume is more than twice the number of silicon atoms per unit volume. The number of silicon atoms and the number of oxygen atoms per unit volume are measured by Rutherford backscattering spectrometry.

The transistor 750 can have a structure similar to that of the transistor 200 illustrated in FIG. 1B. The resistor 751 can have a structure similar to that of the resistor 220 illustrated in FIG. 1C.

A specific structure of the transistor 200 will be described with reference to FIG. 1B. Note that the insulating film 725 illustrated in FIG. 19B corresponds to the insulating film 203 in FIG. 1B.

The transistor 200 includes the oxide semiconductor film 205 over the insulating film 203; the pair of electrodes 207 in contact with the oxide semiconductor film 205; the gate insulating film 209 in contact with the insulating film 203, the oxide semiconductor film 205, and the pair of electrodes 207; and the gate electrode 211 overlapping with the oxide semiconductor film 205 with the gate insulating film 209 provided therebetween. In addition, the transistor 200 includes the insulating film 213 covering the gate insulating film 209 and the gate electrode 211.

The oxide semiconductor film 205 preferably contains at least indium (In) or zinc (Zn). Alternatively, the oxide semiconductor film preferably contains both In and Zn. In order to reduce variation in electrical characteristics of the transistor including the oxide semiconductor, the oxide semiconductor preferably contains one or more of stabilizers in addition to In and/or Zn.

As a stabilizer, gallium (Ga), tin (Sn), hafnium (HD, aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As the oxide semiconductor, for example, the following can be used: indium oxide, tin oxide, zinc oxide, a two-component metal oxide such as an In—Zn-based metal oxide, a Sn—Zn-based metal oxide, an Al—Zn-based metal oxide, a Zn—Mg-based metal oxide, a Sn—Mg-based metal oxide, an In—Mg-based metal oxide, an In—Ga-based metal oxide, or an In—W-based metal oxide, a three-component metal oxide such as an In—Ga—Zn-based metal oxide (also referred to as IGZO), an In—Al—Zn-based metal oxide, an In—Sn—Zn-based metal oxide, a Sn—Ga—Zn-based metal oxide, an Al—Ga—Zn-based metal oxide, a Sn—Al—Zn-based metal oxide, an In—Hf—Zn-based metal oxide, an In—La—Zn-based metal oxide, an In—Ce—Zn-based metal oxide, an In—Pr—Zn-based metal oxide, an In—Nd—Zn-based metal oxide, an In—Sm—Zn-based metal oxide, an In—Eu—Zn-based metal oxide, an In—Gd—Zn-based metal oxide, an In—Tb—Zn-based metal oxide, an In—Dy—Zn-based metal oxide, an In—Ho—Zn-based metal oxide, an In—Er—Zn-based metal oxide, an In—Tm—Zn-based metal oxide, an In—Yb—Zn-based metal oxide, or an In—Lu—Zn-based metal oxide, or a four-component metal oxide such as an In—Sn—Ga—Zn-based metal oxide, an In—Hf—Ga—Zn-based metal oxide, an In—Al—Ga—Zn-based metal oxide, an In—Sn—Al—Zn-based metal oxide, an In—Sn—Hf—Zn-based metal oxide, or an In—Hf—Al—Zn-based metal oxide.

In the above-listed metal oxides, an In—Ga—Zn-based metal oxide, for example, is an oxide whose main components are In, Ga, and Zn, and there is no particular limitation on the ratio of In:Ga:Zn. The In—Ga—Zn-based metal oxide may contain a metal element other than In, Ga, and Zn.

Alternatively, a material represented by $InMO_3(ZnO)_m$ (m>0, m is not an integer) may be used as an oxide semiconductor. Note that M represents one or more metal elements selected from Ga, Fe, Mn, and Co. Alternatively, as the oxide semiconductor, a material represented by $In_2SnO_5(ZnO)_n$ (n>0, n is an integer) may be used.

For example, an In—Ga—Zn-based metal oxide with an atomic ratio of In:Ga:Zn=1:1:1 (=1/3:1/3:1/3), In:Ga:Zn=2:2:1 (=2/5:2/5:1/5), or In:Ga:Zn=3:1:2 (=1/2:1/6:1/3), or an oxide with an atomic ratio close to the above atomic ratios can be used. Alternatively, an In—Sn—Zn-based metal oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

However, without limitation to the materials given above, a material with an appropriate composition may be used in accordance with needed semiconductor characteristics and electric characteristics (e.g., field-effect mobility, the threshold voltage, and variation). In order to obtain necessary semiconductor characteristics, it is preferable that the carrier density, the impurity concentration, the defect density, the atomic ratio of a metal element to oxygen, the interatomic distance, the density, and the like be set to be appropriate.

For example, high mobility can be obtained relatively easily in the case where an In—Sn—Zn-based metal oxide is used. However, the mobility can be increased by reducing the defect density in the bulk also in the case where an In—Ga—Zn-based metal oxide is used.

Further, the energy gap of a metal oxide that can form the oxide semiconductor film 205 is 2 eV or higher, preferably 2.5 eV or higher, more preferably 3 eV or higher. With the use of an oxide semiconductor having a wide energy gap, a transistor can withstand a high voltage and the off-state current of the transistor can be reduced.

Note that the oxide semiconductor film 205 may have an amorphous structure, a single crystal structure, or a polycrystalline structure.

As the oxide semiconductor film 205, a c-axis aligned crystalline oxide semiconductor film (also referred to as CAAC-OS film) having a plurality of crystal parts may be used.

The CAAC-OS film is one of oxide semiconductor films including a plurality of crystal parts, and most of each crystal part fits inside a cube whose one side is less than 100 nm. Thus, there is a case where a crystal part included in the CAAC-OS film fits a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

Note that in this specification, a term "parallel" indicates that the angle formed between two straight lines is greater than or equal to $-10°$ and less than or equal to $10°$, and accordingly also includes the case where the angle is greater than or equal to $-5°$ and less than or equal to $5°$. In addition, a term "perpendicular" indicates that the angle formed between two straight lines is greater than or equal to $80°$ and less than or equal to $100°$, and accordingly includes the case where the angle is greater than or equal to $85°$ and less than or equal to $95°$.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around $31°$. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when $2\theta$ is around $56°$. This peak is derived from the (110) plane of the $InGaZnO_4$ crystal. Here, analysis ($\phi$ scan) is performed under conditions where the sample is rotated around a normal vector of a sample surface as an axis ($\phi$ axis) with $2\theta$ fixed at around $56°$. In the case where the sample is a single crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\phi$ scan is performed with $2\theta$ fixed at around $56°$.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depends on regions.

Note that when the CAAC-OS film with an $InGaZnO_4$ crystal is analyzed by an out-of-plane method, a peak of $2\theta$ may also be observed at around $36°$, in addition to the peak of $2\theta$ at around $31°$. The peak of $2\theta$ at around $36°$ indicates that a crystal having no c-axis alignment is included in part of the CAAC-OS film. It is preferable that in the CAAC-OS film, a peak of $2\theta$ appears at around $31°$ and a peak of $2\theta$ does not appear at around $36°$.

With use of the CAAC-OS film in a transistor, change in electrical characteristics of the transistor due to irradiation with visible light or ultraviolet light is small. Thus, the transistor has high reliability.

Further, the oxide semiconductor film 205 may have a structure in which a plurality of oxide semiconductor films is stacked. For example, the oxide semiconductor film 205 may have a stacked structure of a first oxide semiconductor film and a second oxide semiconductor film that are formed using metal oxides with different compositions. For example, the first oxide semiconductor film may be formed using any of a two-component metal oxide, a three-component metal oxide, and a four-component metal oxide, and the second oxide semiconductor film may be formed using any of these that is different from the oxide for the first oxide semiconductor film.

Further, the constituent elements of the first oxide semiconductor film and the second oxide semiconductor film are made to be the same and the composition of the constituent elements of the first oxide semiconductor film and the second oxide semiconductor film may be made to be different. For example, the first oxide semiconductor film may have an atomic ratio of In to Ga and Zn of 1:1:1 and the second oxide semiconductor film may have an atomic ratio of In to Ga and Zn of 3:1:2. Alternatively, the first oxide semiconductor film may each have an atomic ratio of In to Ga and Zn of 1:3:2, and the second oxide semiconductor film may have an atomic ratio of In to Ga and Zn of 2:1:3.

At this time, one of the first oxide semiconductor film and the second oxide semiconductor film that is closer to a gate electrode (on a channel side) preferably contains In and Ga at a proportion of In>Ga. The other that is farther from the gate electrode (on a back channel side) preferably contains In and Ga at a proportion of In≤Ga.

In an oxide semiconductor, the s orbital of heavy metal mainly contributes to carrier transfer, and when the In content in the oxide semiconductor is increased, overlap of the s orbital is likely to be increased. Therefore, an oxide having a composition of In>Ga has higher mobility than an oxide having a composition of In≤Ga. Furthermore, in Ga, the formation energy of oxygen vacancy is larger and thus oxygen vacancy is less likely to occur, than in In; therefore, the oxide having a composition of In≤Ga has more stable characteristics than the oxide having a composition of In>Ga.

An oxide semiconductor containing In and Ga at a proportion of In>Ga is used on a channel side, and an oxide semiconductor containing In and Ga at a proportion of In≤Ga is used on a back channel side, so that field-effect mobility and reliability of a transistor can be further improved.

Oxide semiconductors that differ in crystallinity may be applied to the first oxide semiconductor film and the second oxide semiconductor film. That is, the first oxide semiconductor film and the second oxide semiconductor film may each be formed by combining a single crystal oxide semiconductor, a polycrystalline oxide semiconductor, an amorphous oxide semiconductor, and a CAAC-OS as appropriate. An amorphous oxide semiconductor is applied to at least one of the first oxide semiconductor film and the second oxide semiconductor film, so that internal stress or external stress of the oxide semiconductor film 205 is relieved, variation in characteristics of a transistor is reduced, and reliability of the transistor can be further improved.

The thickness of the oxide semiconductor film 205 is greater than or equal to 1 nm and less than or equal to 100 nm, preferably greater than or equal to 1 nm and less than or equal to 30 nm, more preferably greater than or equal to 1 nm and less than or equal to 50 nm, still more preferably greater than or equal to 3 nm and less than or equal to 20 nm.

The concentration of alkali metals or alkaline earth metals in the oxide semiconductor film 205 is preferably lower than or equal to $1 \times 10^{18}$ atoms/cm$^3$, more preferably lower than or equal to $2 \times 10^{16}$ atoms/cm$^3$. When alkali metals or alkaline earth metals are bonded to an oxide semiconductor, some of the alkali metals or the alkaline earth metals generate carriers and cause an increase in the off-state current of the transistor.

The oxide semiconductor film 205 may contain nitrogen at a concentration lower than or equal to $5 \times 10^{18}$ atoms/cm$^3$.

The pair of electrodes 207 is formed to have a single-layer structure or a stacked structure including, as a conductive material, any of metals such as aluminum, titanium, chromium, nickel, copper, yttrium, zirconium, molybdenum, silver, tantalum, and tungsten or an alloy containing any of these metals as a main component. For example, a single-layer structure of an aluminum film containing silicon, a two-layer structure in which a titanium film is stacked over an aluminum film, a two-layer structure in which a titanium film is stacked over a tungsten film, a two-layer structure in which a copper film is stacked over a copper-magnesium-aluminum alloy film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order are given. Note that a transparent conductive material containing indium oxide, tin oxide, or zinc oxide may be used.

The gate insulating film 209 may be formed to have a stacked structure or a single-layer structure using any of silicon oxide, silicon oxynitride, a Ga—Zn-based metal oxide film, aluminum oxide, aluminum oxynitride, gallium oxide, gallium oxynitride, yttrium oxide, yttrium oxynitride, hafnium oxide, and hafnium oxynitride, for example. Note that in FIG. 19B, a gate insulating film 726 corresponds to the gate insulating film 209 illustrated in FIG. 1B.

The gate electrode 211 can be formed using a metal element selected from aluminum, chromium, copper, tantalum, titanium, molybdenum, and tungsten; an alloy containing any of these metal elements as a component; an alloy containing any of these metal elements in combination; or the like. Alternatively, one or more metal elements selected from manganese and zirconium may be used. In addition, the gate electrode 211 can have a single-layer structure or a stacked structure including two or more layers. For example, a single-layer structure of an aluminum film containing silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, and a three-layer structure in which a titanium film, an aluminum film, and a titanium film are stacked in this order are given. Alternatively, a film, an alloy film, or a nitride film which contains aluminum and one or more elements selected from titanium, tantalum, tungsten, molybdenum, chromium, neodymium, and scandium may be used.

Alternatively, the gate electrode 211 can be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. It is also possible to have a stacked structure formed using the above light-transmitting conductive material and the above metal element.

An In—Ga—Zn-based oxynitride semiconductor film, an In—Sn-based oxynitride semiconductor film, an In—Ga-based oxynitride semiconductor film, an In—Zn-based oxynitride semiconductor film, a Sn-based oxynitride semiconductor film, an In-based oxynitride semiconductor film, a film of a metal nitride (such as InN or ZnN), or the like is preferably provided between the gate electrode 211 and the gate insulating film 209. These films each have a work function of higher than or equal to 5 eV, preferably higher than or equal to 5.5 eV, which is higher than the electron affinity of the oxide semiconductor; thus, the threshold voltage of the transistor including the oxide semiconductor can be shifted in the positive direction. Accordingly, a so-called normally-off switching element can be obtained. For example, in the case of using an In—Ga—Zn-based oxynitride semiconductor film, an In—Ga—Zn-based oxynitride semiconductor film having a higher nitrogen concentration than at least the oxide semiconductor film 205, specifically, an In—Ga—Zn-based oxynitride semiconductor film having a nitrogen concentration of higher than or equal to 7 at. % is used.

The insulating film 213 may be formed to have a stacked structure or a single-layer structure using any of silicon oxide, silicon oxynitride, silicon nitride oxide, silicon nitride, aluminum oxide, aluminum oxynitride, aluminum nitride oxide, aluminum nitride, and the like. Note that in FIG. 19B, an insulating film 727 corresponds to the insulating film 213 illustrated in FIG. 1B.

Next, a specific structure of the resistor 220 will be described with reference to FIG. 1C. The resistor 220 includes the oxide semiconductor film 225 over the insulating film 203; and the pair of electrodes 227 in contact with the oxide semiconductor film 225. The resistor 220 further includes the gate insulating film 209 and the insulating film 213 which cover the oxide semiconductor film 225 and the pair of electrodes 227.

The oxide semiconductor film 225 can be formed in a manner similar to that of the oxide semiconductor film 205 of the transistor 200.

Note that in order to control the resistance of the resistor 220, a dopant may be added to the oxide semiconductor film 225. As the dopant, at least one of boron, nitrogen, phosphorus, and arsenic can be used. Alternatively, as the dopant, at least one of helium, neon, argon, krypton, and xenon can be used. Still alternatively, the oxide semiconductor film 225 may contain, as dopants, at least one of boron, nitrogen, phosphorus, and arsenic and at least one of helium, neon, argon, krypton, and xenon in appropriate combination.

The concentration of the dopants contained in the oxide semiconductor film 225 is higher than or equal to $5\times10^{18}$ atoms/cm$^3$ and lower than or equal to $1\times10^{22}$ atoms/cm$^3$, preferably higher than or equal to $5\times10^{18}$ atoms/cm$^3$ and lower than $5\times10^{19}$ atoms/cm$^3$.

Since the oxide semiconductor film 225 contains the dopant, the carrier density or the defect density can be increased. Thus, the conductivity can be increased.

The pair of electrodes 227 can be formed in a manner similar to that of the pair of electrodes 207 of the transistor 200.

Note that here, the description is given using the structure of the transistor illustrated in FIG. 1B, but another structure can be used as appropriate. For example, instead of the structure including the pair of electrodes 207 illustrated in FIG. 1B, a structure including a pair of electrodes between the insulating film 203 and the oxide semiconductor film 205 is possible. Furthermore, instead of the structure including the gate insulating film 209 and the gate electrode 211 illustrated in FIG. 1B, a structure including a gate electrode over the insulating film 203, a gate insulating film over the gate electrode, and the oxide semiconductor film 205 over the gate insulating film is possible. Moreover, instead of the structure including the pair of electrodes 207, the gate insulating film 209, and the gate electrode 211 illustrated in FIG. 1B, a structure including a gate electrode over the insulating film 203, a gate insulating film over the gate electrode, a pair of electrodes over the gate insulating film, and the oxide semiconductor film 205 over the gate insulating film and the pair of electrodes is possible. Furthermore, a structure in which a contact plug is directly connected to the oxide semiconductor film 205 without the pair of electrodes is possible.

In a contact hole formed in the barrier film 724 and the insulating film 725, one of a pair of electrodes 729 of the transistor 750 is electrically connected to the diode 704c through the contact plug 714 and a wiring 719.

A gate electrode 731 of the transistor 750 is electrically connected to a terminal 733 of the resistor through a contact plug 735 that penetrates the gate insulating film 726 of the transistor 750, the insulating film 727, and an insulating film 728 and a wiring 737 formed above the transistor 750. The contact plug 735 can be formed with the same material as the pair of electrodes.

The wiring 737 is embedded in an insulating film 730. For the wiring 737, it is preferable to use a low-resistance conductive material such as copper or aluminum. By using a low-resistance conductive material, RC delay of signals transmitted through the wiring 737 can be reduced. In the case where copper is used for the wiring 737, a barrier film is preferably formed between the insulating film 730 and the wiring 737 in order to prevent copper from dispersing into the channel formation region. The barrier film can be formed using, for example, a film of tantalum nitride, a stacked-layer film of tantalum nitride and tantalum, a film of titanium nitride, or a stacked-layer film of titanium nitride and titanium, but are not limited to the films of these materials as long as their function of preventing diffusion of a wiring material and their adhesion to the wiring material, a base film, and the like are secured.

Note that the contact plug 735 and the wiring 737 may be formed with the same material by a dual damascene method.

For the insulating film 728 and the insulating film 730, it is possible to use an insulator such as silicon oxide, silicon oxynitride, silicon nitride oxide, borophosphosilicate glass (BPSG), phosphosilicate glass (PSG), silicon oxide to which carbon is added (SiOC), silicon oxide to which fluorine is added (SiOF), tetraethylorthosilicate (TEOS) which is silicon oxide made from Si(OC$_2$H$_5$)$_4$, hydrogen silsesquioxane (HSQ), methyl silsesquioxane (MSQ), organosilicate glass (OSG), or an organic-polymer-based material. In particular, in the case of advancing miniaturization of the semiconductor device, parasitic capacitance between wirings is significant and signal delay is increased. Therefore, the relative permittivity of silicon oxide (k=4.0 to 4.5) is too high, and it is preferable to use a material with k=3.0 or less. In addition, the insulating film needs to have high mechanical strength because CMP treatment is performed after the wiring is embedded in the insulating film. As long as the mechanical strength can be secured, the insulating film can be made porous to have a lower dielectric constant. The insulating film 730 is formed by a sputtering method, a CVD method, a coating method including a spin coating method (also referred to as spin on glass (SOG)), or the like.

A barrier film 740 is provided over the wiring 737. The barrier film 740 can be formed in a manner similar to that of the barrier film 724.

One of the pair of electrodes 729 of the transistor 750 is connected to the wiring 719. The wiring 719 can have the same structure as the wiring 737. The transistor 704a, the transistor 704b, and the diode 704c are connected to the wirings 719 through the contact plugs 714 that penetrate the insulating film 711 and the insulating film 712. The insulating film 712 can be formed in a manner similar to that of the insulating film 728. The contact plug 714 can be formed in a manner similar to that of the contact plug 735. Like the wiring 737, the wiring 719 is formed to be embedded in the insulating film 715. The insulating film 715 can be formed in a manner similar to that of the insulating film 730. Note that a barrier film may be provided between the insulating film 715 and the wiring 719. An insulating film, which serves as an etching stopper when planarization treatment such as CMP treatment is performed, may be provided over the insulating film 715.

As described above, the elements formed in the element layer 763a and the elements formed in the element layer 763b, such as the transistor, the diode, and the resistor, are electrically connected through a plurality of contact plugs and a plurality of wirings. With the above-described structure in which the transistor including the first semiconductor material and being capable of operating at high speed and the transistor including the second semiconductor material and having a significantly small off-state current are combined, a semiconductor device including a logic circuit capable of operating at high speed with low power consumption, e.g., a memory device or a central processing unit (CPU), can be manufactured.

Such a semiconductor device is not limited to the above structure and can be changed as desired unless it deviates from the spirit of the present invention. For example, although the number of layers including a wiring is one in each of the element layer 763a and the element layer 763b in FIG. 19B, the number of layers including a wiring may be two or more. Alternatively, an element provided in the element layer 763a and an element provided in the element layer 763b can be directly connected to each other only by a contact plug without a wiring. In this case, a through-silicon via (TSV) technique can also be used, for example. In addition, in the above description, a material such as copper is embedded in an insulating film as a wiring, but a wiring having a three-layer structure of a barrier film, a wiring material layer, and a barrier film, for example, may be obtained by patterning through a photolithography process.

In the case where a transistor including a wide-gap semiconductor is used in any of the switches described in Embodiments 1 to Embodiment 3, the switch may be formed in the element layer 763b. Thus, the number of components of the switching converter can be reduced.

The element layer may have a stacked structure of three or more layers. For example, an element layer in which a transistor including a wide-gap semiconductor is provided as the switch 111 may be formed over the element layer 763b illustrated in FIG. 19B. By employing the structure, in the switching converter 180 illustrated in FIG. 12, a ground to which the transistor 153 included in the starter circuit 115 is connected and a ground to which the switch 111 is connected are electrically connected to a grounded member through the respective conductive materials; therefore, adverse effects of noise generated in the switch 111 and the starter circuit 115 can be suppressed.

This embodiment can be implemented by being combined as appropriate with any of the other embodiments.

Embodiment 4

In this embodiment, a semiconductor device provided with the switching converter described in Embodiment 1 and Embodiment 3 and an electronic device including the semiconductor device will be described. Note that the present invention includes, in its category, all the semiconductor devices, for example, integrated circuits such as microprocessors and image processing circuits, RF tags, memory media, solar cells, lighting devices including light-emitting elements, and display devices. Further, the display devices include display devices including the switching converter, such as liquid crystal display devices, lighting devices including a light-emitting element typified by an organic light-emitting element (OLED), electronic paper, digital micromirror devices (DMD), plasma display panels (PDP), field emission displays (FED), and the like, in its category.

In this embodiment, a lighting device will be described as an example of the semiconductor device.

First, a structure of the lighting device will be described with reference to FIG. 20.

Figure 20:
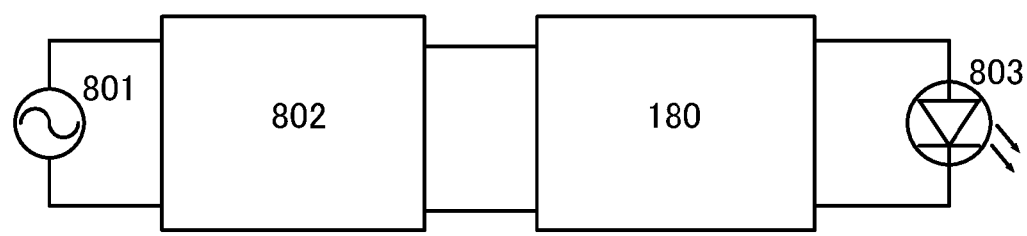
FIG. 20 is a block diagram illustrating a structure of a lighting device.

The lighting device illustrated in FIG. 20 includes an alternating current power supply 801, a rectifying and smoothing circuit 802, the switching converter 180, and a light-emitting element 803.

The step-down switching converter described in Embodiment 2 is used as the switching converter 180 illustrated in FIG. 20. Note that any of the switching converters described in Embodiment 1 and Embodiment 2 can be used as appropriate. In the lighting device illustrated in FIG. 20, an alternating current from the alternating current power supply 801 flows in the rectifying and smoothing circuit 802, and then the alternating current is converted into a direct current with a certain current value by the switching converter 180. That is, an input voltage is stepped down and output by the switching converter 180.

The voltage output from the switching converter 180 is supplied to the light-emitting element 803, so that the light-emitting element 803 emits light. A variety of light sources, such as a light-emitting diode (LED) or an organic electroluminescence (EL) element can be used for the light-emitting element 803.

In addition, although in FIG. 20, a structure of a lighting device in which the alternating current power supply 801 is used as a power source is illustrated, a lighting device of one embodiment of the present invention does not necessarily include a power source as its component.

With the use of any of the switching converters described in Embodiments 1 to 3 for the semiconductor device of this embodiment, the power conversion efficiency of the switching converter can be improved. Such an improvement in the power conversion efficiency of the switching converter leads to a reduction in the power consumption of the semiconductor device.

Note that in a solar cell, which is an example of the semiconductor device, a photodiode or the like is used for the power supply portion 101 illustrated in FIG. 11. A step-up switching converter is used as the switching converter 180. With such a structure, a starting voltage generated by the photodiode can be amplified and output to the output portion 109.

The above-described semiconductor devices can be applied to a variety of electronic devices. Examples of the electronic devices are as follows: display devices, lighting devices, personal computers, word processors, image reproducing devices, portable compact disc (CD) players, radio receivers, tape recorders, headphone stereos, stereos, clocks, cordless phone handsets, transceivers, portable wireless devices, cellular phones, smart phones, electronic books, car phones, portable game machines, calculators, portable information terminals, e-book readers, electronic translators, audio input devices, cameras such as video cameras or digital still cameras, electric shavers, high-frequency heating appliances, electric rice cookers, electric washing machines, electric vacuum cleaners, water heaters, electric fans, hair dryers, air conditioners, humidifiers, dehumidifiers, air-conditioning systems, dishwashing machines, dish drying machines, clothes dryers, futon dryers, electric refrigerators, electric freezers, electric refrigerator-freezers, freezers for preserving DNA, flashlights, electric power tools, smoke detectors, medical equipments, guide lights, traffic lights, belt conveyors, elevators, escalators, industrial robots, power storage systems, electric vehicles, hybrid electric vehicles, plug-in hybrid electric vehicles, tracked vehicles, motorized bicycles, motorcycles, electric wheelchairs, golf carts, boats, ships, submarines, helicopters, aircrafts, rockets, artificial satellites, space probes, planetary probes, and spacecrafts.

With the use of any of the above-described semiconductor devices for an electronic device, the power consumption of the electronic device can be reduced.

This embodiment can be implemented by being combined as appropriate with any of the above embodiments.

This application is based on Japanese Patent Application serial no. 2012-105359 filed with Japan Patent Office on May 2, 2012 and Japanese Patent Application serial no. 2013-042517 filed with Japan Patent Office on Mar. 5, 2013, the entire contents of which are hereby incorporated by reference.

What is claimed is:

1. A switching converter comprising:
a transformer electrically connected to a power supply portion;
a switch whose one of a source and a drain is electrically connected to the transformer;
a switching control circuit electrically connected to the switch, the switching control circuit comprising:
 a control circuit; and
 a starter circuit, the starter circuit comprising:
  a first transistor and a second transistor each comprising an oxide semiconductor film in a channel region; and
  a resistor comprising a film comprising an oxide semiconductor, wherein a first terminal of the resistor is electrically connected to one of a source and a drain of the first transistor, and a second terminal of the resistor is electrically connected to a gate of the first transistor and one of a source and a drain of the second transistor;
a first rectifying and smoothing circuit whose first terminal is electrically connected to the transformer and whose second terminal is electrically connected to an output portion; and
a second rectifying and smoothing circuit whose first terminal is electrically connected to the transformer and whose second terminal is electrically connected to the switching control circuit,
wherein the one of the source and the drain of the switch is electrically connected to the first terminal of the first rectifying and smoothing circuit,
wherein the other of the source and the drain of the second transistor is directly connected to a ground,
wherein the starter circuit further comprises a diode whose first terminal is electrically connected to the other of the source and the drain of the first transistor and whose second terminal is electrically connected to a first terminal of the control circuit,
wherein the one of a source and a drain of the first transistor and the first terminal of the resistor are electrically connected to the one of the source and the drain of the switch,
wherein a gate of the second transistor is electrically connected to a second terminal of the control circuit, and
wherein a gate of the switch is electrically connected to a third terminal of the control circuit.

2. The switching converter according to claim 1, wherein the other of the source and the drain of the switch is electrically connected to a terminal of the output portion.

3. The switching converter according to claim 1, wherein the other of the source and the drain of the switch is directly connected to a ground.

4. The switching converter according to claim 1,
wherein an element in the control circuit and the diode in the starter circuit are provided in a first element layer,
wherein the first transistor, the second transistor, and the resistor in the starter circuit are provided in a second element layer,
wherein the second element layer is provided over the first element layer,
wherein the first element layer comprises a semiconductor substrate,
wherein the semiconductor substrate in the first element layer is grounded, and
wherein an eleventh terminal of the second element layer is grounded through a conductive material.

5. A device comprising:
a transformer electrically connected to a power supply portion;
a switch whose one of a source and a drain is electrically connected to the transformer;
a switching control circuit electrically connected to the switch, the switching control circuit comprising:
 a control circuit comprising an element that comprises a semiconductor different from an oxide semiconductor; and
 a starter circuit, the starter circuit comprising:
  a first transistor and a second transistor each comprising an oxide semiconductor film in a channel region; and
  a resistor comprising a film comprising an oxide semiconductor, wherein a first terminal of the resistor is electrically connected to one of a source and a drain of the first transistor, and a second terminal of the resistor is electrically connected to a gate of the first transistor and one of a source and a drain of the second transistor;
a first rectifying and smoothing circuit whose first terminal is electrically connected to the transformer and whose second terminal is electrically connected to an output portion; and
a second rectifying and smoothing circuit whose first terminal is electrically connected to the transformer and whose second terminal is electrically connected to the switching control circuit,
wherein the one of the source and the drain of the switch is electrically connected to the first terminal of the first rectifying and smoothing circuit,
wherein the other of the source and the drain of the second transistor is directly connected to a ground,
wherein the starter circuit further comprises a diode whose first terminal is electrically connected to the other of the source and the drain of the first transistor and whose second terminal is electrically connected to a first terminal of the control circuit,
wherein the one of a source and a drain of the first transistor and the first terminal of the resistor are electrically connected to the one of the source and the drain of the switch,
wherein a gate of the second transistor is electrically connected to a second terminal of the control circuit, and wherein a gate of the switch is electrically connected to a third terminal of the control circuit.

6. The device according to claim 5, wherein the other of the source and the drain of the switch is electrically connected to a terminal of the output portion.

7. The device according to claim 5, wherein the other of the source and the drain of the switch is directly connected to a ground.

8. The device according to claim 5,
wherein an element in the control circuit and the diode in the starter circuit are provided in a first element layer,
wherein the first transistor, the second transistor, and the resistor in the starter circuit are provided in a second element layer,
wherein the second element layer is provided over the first element layer,
wherein the first element layer comprises a semiconductor substrate,
wherein the semiconductor substrate in the first element layer is grounded, and
wherein an eleventh terminal of the second element layer is grounded through a conductive material.

* * * * *